(12) United States Patent
Ryu et al.

(10) Patent No.: US 11,438,101 B2
(45) Date of Patent: Sep. 6, 2022

(54) METHOD AND APPARATUS FOR FEEDBACK TRANSMISSION OR RECEPTION IN WIRELESS COMMUNICATION SYSTEM

(71) Applicant: Samsung Electronics Co., Ltd., Suwon-si (KR)

(72) Inventors: Hyunseok Ryu, Suwon-si (KR); Hyunjeong Kang, Suwon-si (KR); Taehan Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 74 days.

(21) Appl. No.: 16/826,676

(22) Filed: Mar. 23, 2020

(65) Prior Publication Data

US 2020/0313804 A1    Oct. 1, 2020

(30) Foreign Application Priority Data

Mar. 28, 2019    (KR) .................. 10-2019-0035555

(51) Int. Cl.
*H04L 1/18*    (2006.01)
*H04L 5/00*    (2006.01)
*H04W 72/04*    (2009.01)

(52) U.S. Cl.
CPC .......... *H04L 1/1812* (2013.01); *H04L 1/1861* (2013.01); *H04L 5/0055* (2013.01); *H04W 72/0406* (2013.01); *H04W 72/0446* (2013.01)

(58) Field of Classification Search
CPC ... H04W 28/04; H04W 72/04; H04W 72/042; H04W 88/08; H04W 72/0446;

(Continued)

(56) References Cited

U.S. PATENT DOCUMENTS 4,284,160 A * 8/1981 DeLiban ................. B62D 1/28
                                                    104/299
10,785,753 B1 * 9/2020 Li ........................ H04L 1/1887
(Continued)

OTHER PUBLICATIONS

3GPP TSG RAN WG1 Meeting #96, Athens, Greece, Feb. 25-Mar. 1, 2019, R1-1901931, Agenda Item: 7.2.4.1.2, Source: LG Electronics, Title: Discussion on physical layer procedure for NR V2X. (Year: 2019).*

(Continued)

*Primary Examiner* — Peter G Solinsky
*Assistant Examiner* — Sanjay K Dewan
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method performed by a first terminal in a communication system is provided. The method includes transmitting data of a physical side link shared channel (PSSCH) and sidelink control information (SCI) associated with the data, and receiving, from a second terminal, a hybrid automatic repeat request (HARQ) feedback for the data, wherein the HARQ feedback is performed based on a distance between the first terminal and the second terminal, in case that the SCI includes location information of the first terminal.

22 Claims, 15 Drawing Sheets

(58) Field of Classification Search
CPC .......... H04W 72/0406; H04W 72/045; H04L 5/0007; H04L 1/1861; H04L 5/0055; H04L 1/1812
USPC .......................................................... 370/329
See application file for complete search history.

(56) References Cited

U.S. PATENT DOCUMENTS

| | | | | |
|---|---|---|---|---|
| 2014/0223020 | A1* | 8/2014 | Hyman | H04W 4/025 709/228 |
| 2019/0044667 | A1* | 2/2019 | Guo | H04L 1/1893 |
| 2019/0075548 | A1* | 3/2019 | Lee | H04W 72/044 |
| 2019/0174530 | A1* | 6/2019 | Kim | H04L 1/0025 |
| 2019/0261216 | A1* | 8/2019 | Lee | H04W 72/0406 |
| 2020/0045674 | A1* | 2/2020 | Tseng | H04W 76/14 |
| 2020/0053835 | A1* | 2/2020 | Ye | H04L 1/08 |
| 2020/0112400 | A1* | 4/2020 | Lee | H04L 1/1819 |
| 2020/0145867 | A1* | 5/2020 | Tseng | H04L 1/0026 |
| 2020/0178039 | A1* | 6/2020 | Lee | H04L 1/1819 |
| 2020/0267597 | A1* | 8/2020 | Huang | H04W 76/14 |
| 2020/0280398 | A1* | 9/2020 | Hwang | H04W 72/0446 |
| 2020/0288435 | A1* | 9/2020 | Kwak | H04L 1/0075 |
| 2020/0304247 | A1* | 9/2020 | Loehr | H04L 1/1845 |
| 2020/0336872 | A1* | 10/2020 | Basu Mallick | H04W 4/029 |
| 2020/0372721 | A1* | 11/2020 | Salminen | H04L 67/38 |
| 2020/0389257 | A1* | 12/2020 | Kung | H04W 4/40 |
| 2021/0028910 | A1* | 1/2021 | Cheng | H04L 5/0064 |
| 2021/0050953 | A1* | 2/2021 | Park | H04W 72/1263 |
| 2021/0203453 | A1* | 7/2021 | Kim | H04W 64/006 |

OTHER PUBLICATIONS

3GPP TSG RAN WG1 Meeting #96, Athens, Greece, Feb. 25-Mar. 1, 2019, R1-1902995, Agenda Item: 7.2.4.1.2, Source: Qualcomm Incorporated, Title: Physical layer procedure for HARQ operation for groupcast and unicast transmissions. (Year: 2019).*

3GPP TSG-RAN WG1 Meeting # ah-1901, Taipei, Taiwan, Jan. 21-25, 2019, R1-1901212, Agenda Item: 7.2.4.1.2, Source: Ericsson, Title: On PHY procedures to support unicast and groupcast on NR sidelink. (Year: 2019).*

3GPP TSG RAN WG1 Ad-Hoc, Meeting 1901, Taipei, Jan. 21-25, 2019, R1-1900023, Agenda Item: 7.2.4.1.2, Source: Huawei, HiSilicon, Title: Sidelink physical layer procedures for NR V2X. (Year: 2019).*

LG Electronics, Discussion on physical layer procedure for NR V2X, R1-1901931, 3GPP TSG RAN WG1 Meeting #96, Athens, Greece, Feb. 16, 2019, sections 1, 2.2.2-2.2.3.

Qualcomm Incorporated, Physical layer procedures for HARQ operation for groupcast and unicast transmissions, R1-1902995, 3GPP TSG RAN WG1 Meeting #96, Athens, Greece, Feb. 16, 2019, section 2.1.1.

Ericsson, On PHY procedures to support unicast and groupcast on NR sidelink, R1-1901212, 3GPP TSG-RAN WG1 Meeting # ah-1901, Taipei, Taiwan, Jan. 11, 2019, section 3.

Huawei et al., Sidelink physical layer procedures for NR V2X, R1-1900023, 3GPP TSG RAN WG1 Ad-Hoc Meeting 1901, Taipei, Taiwan, Jan. 11, 2019 section 2.3.

International Search Report dated Jun. 29, 2020, issued in International Application No. PCT/KR2020/003934.

* cited by examiner

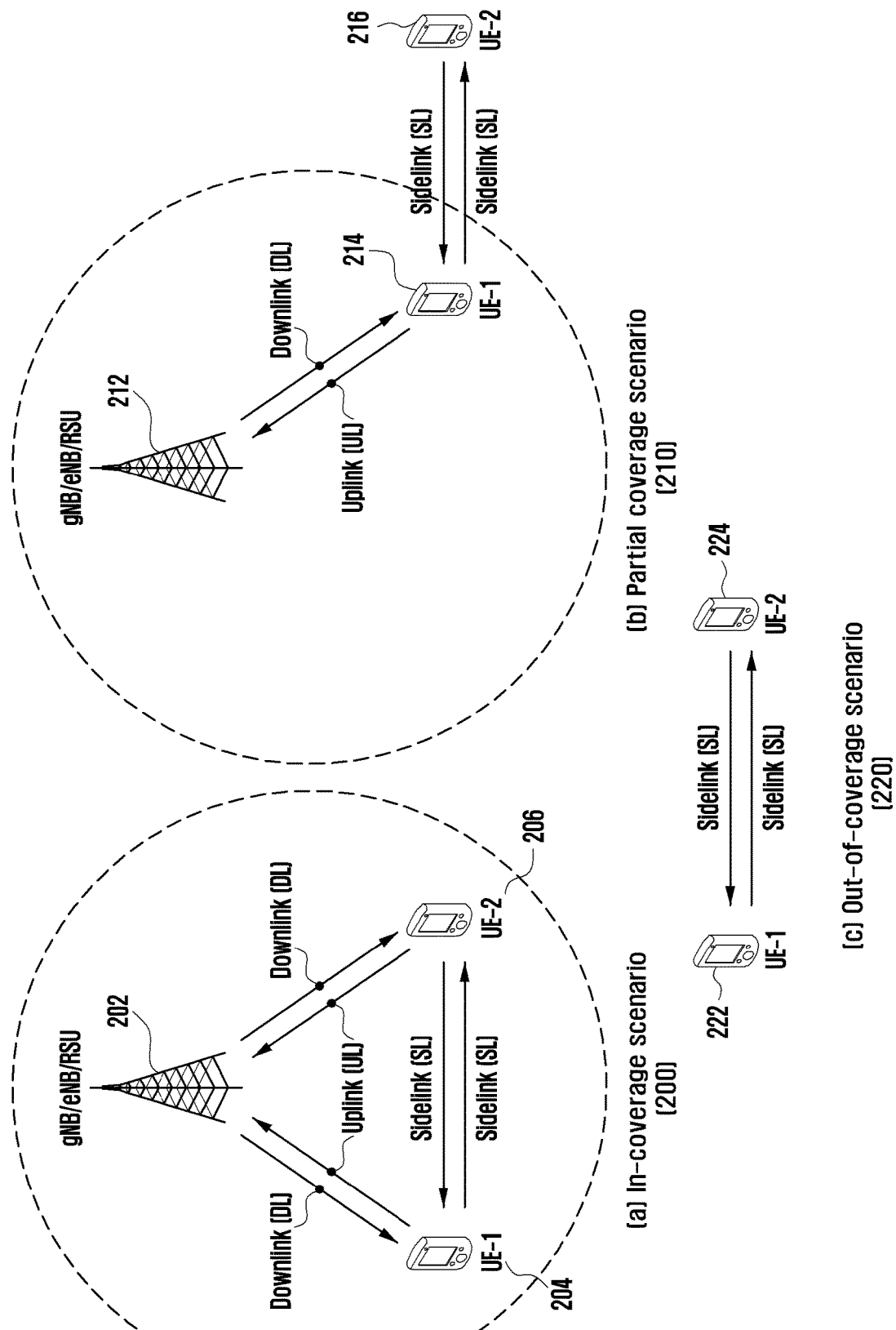

METHOD AND APPARATUS FOR FEEDBACK TRANSMISSION OR RECEPTION IN WIRELESS COMMUNICATION SYSTEM

CROSS-REFERENCE TO RELATED APPLICATION(S)

This application is based on and claims priority under 35 U.S.C. § 119 of a Korean patent application number 10-2019-0035555, filed on Mar. 28, 2019, in the Korean Intellectual Property Office, the disclosure of which is incorporated by reference here in its entirety.

BACKGROUND

1. Field

The disclosure relates to a method and an apparatus for feedback transmission or reception in a communication system. More particularly, the disclosure relates to a method and an apparatus for feedback in a vehicle to everything (0) system of a next generation mobile communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology. In addition, vehicle communication (Vehicle-to-everything, (V2X)) using a 5G communication system is being studied, and various services using V2X can be expected to be provided to users.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an improved communication method and apparatus in a communication system.

Another aspect of the disclosure is to provide a method and an apparatus for feedback transmission or reception in a communication system.

Another aspect of the disclosure is to provide a method and an apparatus for feedback in a vehicle to everything (V2X) system of a next generation mobile communication system.

Additional aspects will be set forth in part in the description which follows and, in part, will be apparent from the description, or may be learned by practice of the presented embodiments.

In accordance with an aspect of the disclosure, a method performed by a first terminal in a communication system is provided. The method includes transmitting data of a physical side link shared channel (PSSCH) and sidelink control information (SCI) associated with the data, and receiving, from a second terminal, a hybrid automatic repeat request (HARQ) feedback for the data, wherein the HARQ feedback is performed based on a distance between the first terminal and the second terminal, in case that the SCI includes location information of the first terminal.

In accordance with another aspect of the disclosure, a method performed by a second terminal in a communication system is provided. The method includes receiving, from a first terminal, data of a physical side link shared channel (PSSCH) and sidelink control information (SCI) associated with the data, and transmitting, to the first terminal, a hybrid automatic repeat request (HARQ) feedback for the data, wherein the HARQ feedback is performed based on a distance between the first terminal and the second terminal, in case that the SCI includes location information of the first terminal.

In accordance with another aspect of the disclosure, a first terminal in a communication system is provided. The first terminal includes a transceiver, and a controller configured to transmit, via the transceiver, data of a physical side link shared channel (PSSCH) and sidelink control information (SCI) associated with the data, and to receive, from a second terminal via the transceiver, a hybrid automatic repeat request (HARQ) feedback for the data, wherein the HARQ feedback is performed based on a distance between the first terminal and the second terminal, in case that the SCI includes location information of the first terminal.

In accordance with another aspect of the disclosure, a second terminal in a communication system is provided. The second terminal includes a transceiver, and a controller configured to receive, from a first terminal via the transceiver, data of a physical side link shared channel (PSSCH) and sidelink control information (SCI) associated with the data, and to transmit, to the first terminal via the transceiver, a hybrid automatic repeat request (HARQ) feedback for the data, wherein the HARQ feedback is performed based on a distance between the first terminal and the second terminal, in case that the SCI includes location information of the first terminal.

The technical subjects pursued in the disclosure may not be limited to the above mentioned technical subjects, and other technical subjects which are not mentioned may be clearly understood, through the following descriptions, by those skilled in the art to which the disclosure pertains.

An embodiment may provide an improved communication method and apparatus in a communication system. Further, an embodiment may provide an improved method and apparatus for feedback transmission or reception in a communication system. Still further, an embodiment may provide an improved feedback method and apparatus in a vehicle to everything (V2X) system of a next generation mobile communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2A illustrates a coverage of a base station of a vehicle to everything (V2X) system according to an embodiment of the disclosure;

Throughout the drawings, it should be noted that like reference numbers are used to depict the same or similar elements, features, and structures.

DETAILED DESCRIPTION

Figure 1:
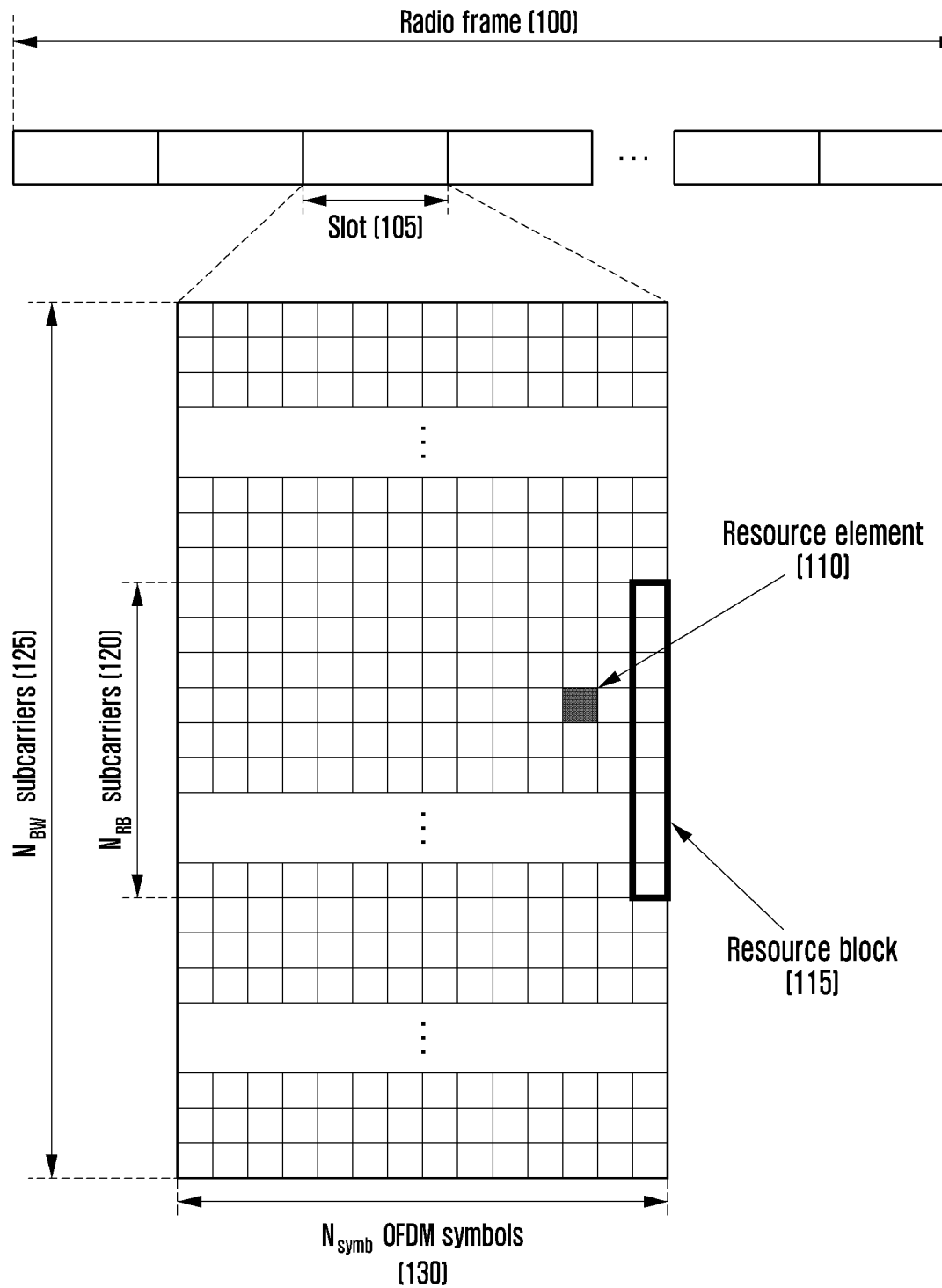
FIG. 1 illustrates a structure of a radio time-frequency resource of a new radio access network (NR) system according to an embodiment.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used to by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

Thus, for example, reference to "a component surface" includes reference to one or more of such surfaces.

In describing the embodiments of the disclosure, descriptions related to technical contents which are well-known in the art to which the disclosure pertains, and are not directly associated with the disclosure, will be omitted. Such omission of unnecessary descriptions is intended to prevent obscuring of the main idea of the disclosure in order to more clearly convey the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and the manner of achieving them will become apparent with reference to the embodiments described in detail below with reference to the accompanying drawings. The disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. To fully disclose the scope of the disclosure to those skilled in the art, and the disclosure is only defined by the scope of the claims.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

The embodiments will be described in detail mainly for a new radio access network (RAN) new RAN (NR) that is a radio access network, and a packet core ($5^{th}$ generation (5G) system, 5G core network, next generation core (NG Core)) that is a core network, based on the 5G mobile communication standard specified by 3rd generation partnership project long term evolution (3GPP), which is a mobile communication standardization organization. However, the main subject matter of the disclosure is applicable with a slight modification without departing from the scope of the disclosure to other communication systems having a similar technical background, which will be determined by those skilled in the art.

In the 5G system, in order to support network automation, a network data collection and analysis function (NWDAF), which is a network function that provides a function of analyzing and providing data collected from a 5G network, may be defined. The NWDAF may collect/store/analyze information from the 5G network and provide the results thereof to unspecified network functions (NFs), and the result of analysis may be used independently in each NF.

Hereinafter, for convenience of explanation, some terms and names defined in the 3GPP standard (standards of 5G, NR, long term evolution (LTE), or a system similar thereto) may be used. However, these are not limited by the terms and names of the disclosure, and may be equally applied to systems conforming to other standards.

In addition, in the following description, terms used to identify a connection node, terms referring to a network entity, terms referring to messages, terms referring to interfaces between network entities, and terms referring to various identification information are exemplarily described for convenience of explanation. However, these are not limited to the terms used in the disclosure, and other terms may be used to refer to an object having a technical meaning equivalent thereto.

In the case of vehicle communication, in the LTE system, standardization work for vehicle to everything (V2X) technology based on device-to-device (D2D) communication structure has been completed in 3GPP Release 14 and Release 15, and efforts in the development of V2X technology based on 5G NR are underway. In NR V2X, terminal-to-terminal unicast communication, groupcast (or multicast) communication, and broadcast communication will be supported. In addition, differently from LTE V2X aiming to transmit or receive basic safety information required for road driving of vehicles, the NR V2X aims to provide more advanced services, such as platooning, advanced driving, an extended sensor, remote driving.

A V2X service may be divided into a basic safety service and an advanced service. The basic safety service may include services from a vehicle notification (cooperative awareness messages (CAM) or basic safety message (BSM)) service to detailed services, such as a left turn notification service, a front vehicle crash alert service, an emergency vehicle approach notification service, a forward obstacle alert service, and an intersection signal information service, and V2X information may be transmitted or received using a broadcast, a unicast, a groupcast transmission method. The advanced service not only enhances QoS safety requirements over the basic safety service, but also requires a scheme capable of transmitting or receiving V2X information by using the unicast and groupcast transmission methods in addition to the broadcast transmission method in order to transmit or receive V2X information within a specific vehicle group or transmit or receive V2X information between two vehicles. The advanced service may include detailed services, such as a cluster driving service, an autonomous driving service, a remote driving service, and an extended sensor-based V2X service.

Hereinafter, a sidelink (SL) refers to a signal transmission/reception path between a terminal and a terminal, which may be interchangeably used with a PC5 interface. Hereinafter, a base station is a subject that performs resource allocation of a terminal, and may be a base station supporting both V2X communication and general cellular communication, or a base station supporting only V2X communication. That is, the base station may refer to an NR base station (gNB), an LTE base station (eNB), or a road side unit (RSU). A terminal may include not only a general user equipment and a mobile station, but also a vehicle supporting vehicle-to-vehicle (V2V) communication, a pedestrian handset (e.g., a smailphone) or a vehicle supporting vehicle-to-pedestrian (V2P) communication, a vehicle supporting vehicle-to-network (V2N) communication, a vehicle supporting vehicle-to-infrastructure (V2I) communication, an RSU equipped with a terminal function, an RSU equipped with a base station function, or an RSU equipped with a part of a base station function and a part of a terminal function. In addition, the V2X terminal used in the following description may be referred to as a terminal. That is, in relation to V2X communication, a terminal may be used as a V2X terminal.

The base station and the terminal are connected via a Uu interface. Uplink (UL) refers to a radio link through which a terminal transmits data or a control signal to a base station, and downlink (DL) refers to a radio link through which the base station transmits data or a control signal to the terminal.

Hereinafter, in various embodiments, hybrid automatic repeat request (HARQ) feedback may be interchangeably used with feedback information and HARQ ACK/NACK.

FIG. 1 illustrates a structure of a radio time-frequency resource of an NR system according to an embodiment of the disclosure.

Referring to FIG. 1, in a radio resource region, a horizontal axis indicates a time domain, and a vertical axis indicates a frequency domain. The minimum transmission unit in the time domain is an orthogonal frequency-division multiplexing (OFDM) symbol or a discrete fourier transform spread OFDM (DFT-S-OFDM) symbol, and $N_{symb}$ number of OFDM symbols or $N_{symb}$ number of DFT-S-OFDM symbols 130 may be collected to configure one slot 105. Unlike a slot, the length of a subframe in the NR system may be defined as 1.0 ms, and a radio frame 100 may be defined as 10 ms. The minimum transmission unit in the frequency domain is a subcarrier, and an entire system transmission bandwidth may be configured by a total NBW number of subcarriers 125. However, these detailed values may be applied variably depending on a system The basic unit of the time-frequency domain is a resource element (RE) 110, and the RE may be represented by an OFDM symbol index, a DFT-S-OFDM symbol index, and a subcarrier index. A resource block (RB) 115 is defined by $N_{RB}$ number of consecutive subcarriers 120 in the frequency domain. In general, the minimum transmission unit of data is the unit of RB. In the NR system, in general, $N_{symb}$ is 14, $N_{RB}$ is 12.

The structure of the radio time-frequency resource is applied to the Uu interface, but can be similarly applied to sidelink communication.

FIG. 2A illustrates a coverage of a base station of a V2X system according to an embodiment of the disclosure.

Referring to FIG. 2A, an in-coverage scenario 200 may refer to a case where all V2X UEs (UE1 204 and UE2 206) are located within the coverage of a base station 202. In this case, all V2X UEs 204 and 206 may receive data and control information from the base station 202 through downlink or transmit data and control information through uplink to the base station. The data or control information may be data and control information for V2X communication or data and control information for general cellular communication. In addition, V2X UEs may transmit or receive data and control information for V2X communication via a sidelink.

A partial coverage scenario 210 refers to a case where, among V2X UEs, UE1 214 is located within the coverage of a base station 212 and UE2 216 is located out of the coverage of the base station 212. UE1 214 located within the coverage of the base station 212 may receive data and control information from the base station 212 via downlink or transmit data and control information through uplink to the base station 212. UE2 216 located out of the coverage of the base station 212 may not receive data and control information from the base station 212 through downlink, and may not transmit data and control information through the uplink to the base station 212. UE2 216 may transmit or receive data and control information for V2X communication to or from UE1 214 via a sidelink.

An out-of-coverage scenario 220 is an example of the case where all V2X UEs 222 and 224 are located out-of-coverage of the base station. Accordingly, UE1 222 and the UE2 224 may not receive data and control information from the base station through downlink, and may not transmit data and control information through uplink to the base station. UE1 222 and UE2 224 may transmit or receive data and control information for V2X communication via a sidelink.

Figure 2B:
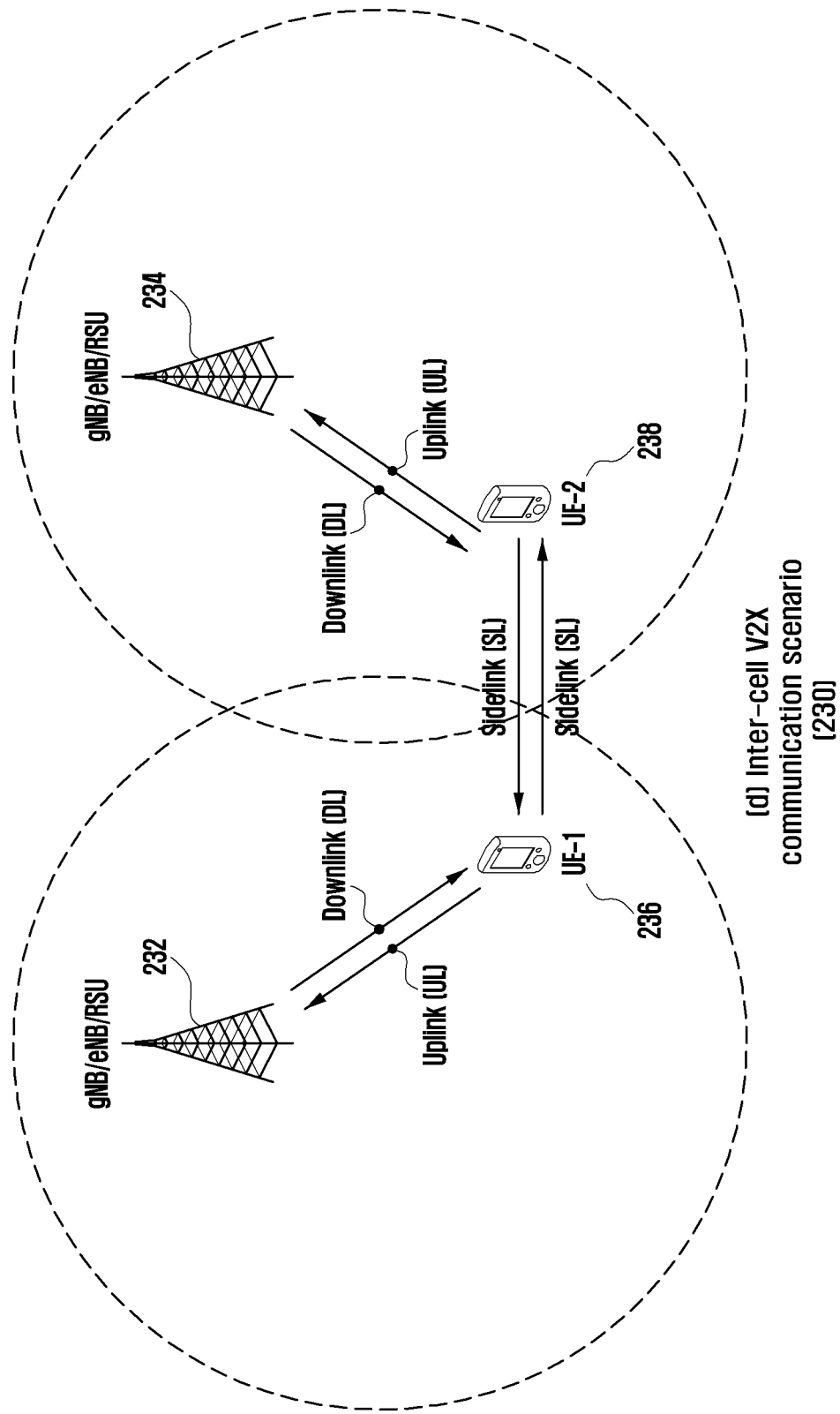
FIG. 2B illustrates a coverage of a base station of a V2X system according to an embodiment of the disclosure.

FIG. 2B illustrates a coverage of a base station a V2X system according to an embodiment of the disclosure.

Referring to FIG. 2B, an inter-cell V2X communication scenario 230 is a scenario of performing V2X communication between terminals located in different cells. Specifically, in the scenario 230, a V2X transmission UE and a V2X reception UE may be connected to different base stations, respectively (radio resource control (RRC) connected state) or may be camped to each other (RRC idle state or RRC inactive state). In this case, UE1 236 may be a V2X transmission UE and UE2 238 may be a V2X reception UE, or UE1 236 may be a V2X reception UE and UE2 238 may be a V2X transmission UE. In relation to feedback operation, a transmission UE may be a terminal transmitting a PSCCH and a PSSCH, and a reception UE may be a terminal receiving the PSCCH and the PSSCH or a terminal transmitting a PSFCH based on decoding of the PSSCH. UE1 236 may receive a system information block (SIB) for V2X from a base station 232 to which UE1 236 itself is connected (or on which UE1 236 itself is camped), and UE2 238 may receive an SIB for V2X from another base station 234 to which UE1 238 itself is connected (or on which UE1 238 itself is camped). At this time, information of the SIB for V2X, received by the UE1 236, and the information of the SIB for V2X, received by the UE2 238, may be different from each other.

In FIGS. 2A and 2B, for convenience of explanation, a V2X system including two terminals UE1 and UE2 is illustrated, but is not limited thereto, and a various number of terminals may participate in the V2X system.

Figure 3:
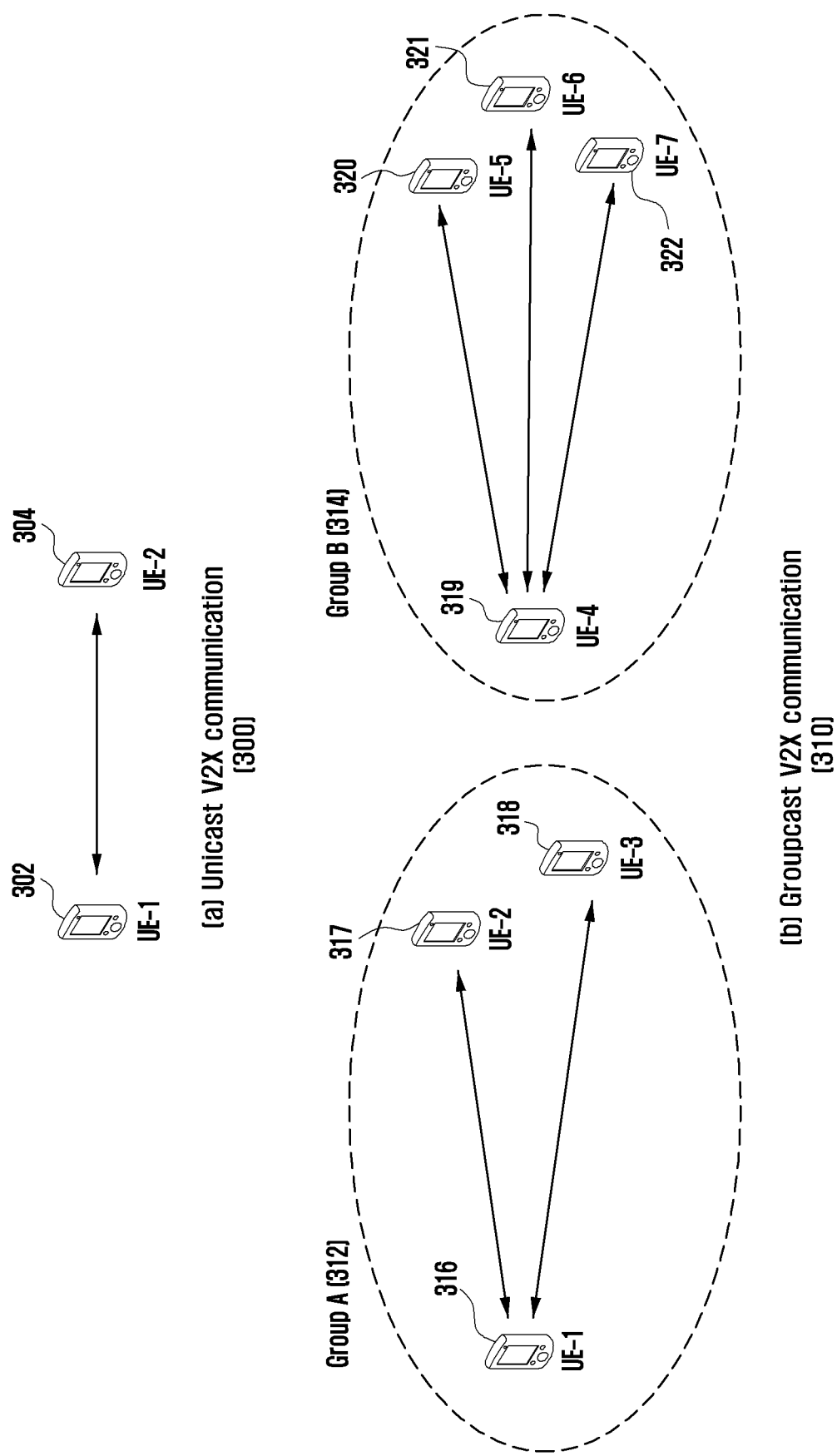
FIG. 3 illustrates V2X communication performed via a sidelink according to an embodiment of the disclosure.

FIG. 3 illustrates V2X communication performed via a sidelink according to an embodiment of the disclosure.

Referring to FIG. 3, unicast communication 300 refers to a case where a transmission UE 302 or 304 and a reception UE 304 or 302 perform one-to-one communication.

In addition, groupcast or multicast communication 310 refers to a case where a transmission UE and a reception UE perform one-to-many communication. In groupcast, UE1, UE2, and UE3 form one group (group A) 312 to perform groupcast communication, and UE4, UE5, UE6, and UE7 form another group (group B) 314 to perform groupcast communication. Each UE performs groupcast communication only within a group to which each UE belongs, and communication with UEs in a different group may be performed according to a unicast, a groupcast, or a broadcast communication method. FIG. 3 illustrates an example in which two groups are formed, but is not limited thereto. Each group may include at least one UE. In addition, UEs may belong to at least two groups.

Although not shown in FIG. 3, V2X UEs may perform broadcast communication. The broadcast communication refers to a case where all V2X UEs receive data and control information, which are transmitted by a V2X transmission UE via a sidelink. For example, in groupcast V2X communication 310, if UE1 316 is assumed to be a transmission UE for broadcast, all terminals UE2 317, UE3 318, UE4 319, UE5 320, UE6 321, and UE7 322 may receive data and control information, which are transmitted by UE1 316.

Sidelink broadcast, groupcast, and unicast communication methods according to an embodiment may be supported by the in-coverage, out-of-coverage, and partial-coverage scenarios.

In NR V2X, unlike LTE V2X, support of a transmission mode in which a vehicle UE transmits data to only one specific UE through unicast communication and a transmission mode in which data is transmitted to a plurality of specific UEs through groupcast communication may be considered. For example, in the case of considering a service scenario such as platooning, which is a technology in which two or more vehicles are connected via one network and bundled in a cluster and moved, such unicast and groupcast technologies may be usefully used. In more detail, a leader UE of a group connected via platooning may require unicast communication for the purpose of controlling one specific UE, and may require groupcast communication for the purpose of simultaneously controlling a group of a plurality of specific UEs.

Resource allocation in a V2X system may be performed using the following method.

Mode 1 Resource Allocation

Scheduled resource allocation is a method in which a base station allocates resources used for sidelink transmission to RRC-connected UEs in a dedicated scheduling manner. The scheduled resource allocation method can be effective for interference management and resource pool management (dynamic allocation and/or semi-persistent transmission) because the base station may manage resources of a sidelink. If there is data to be transmitted to the other UE(s), a UE in an RRC connected mode may transmit information notifying a base station that there is data to be transmitted to the other UE(s) by using an RRC message or a MAC control element (CE). For example, the RRC message may be sidelink UE information (SidelinkUEinformation) and UE assistance information message (UEAssistanceInformation), and the MAC CE may include buffer status report BSR MAC CE, which includes at least one of an indicator indicating a BSR for V2X communication and information about the size of data buffered for sidelink communication, and a scheduling request (SR).

Mode 2 Resource Allocation

Secondly, UE autonomous resource selection is a method in which a base station provides a UE with a sidelink transmission/reception resource pool for V2X through system information or an RRC message (e.g., an RRCReconfiguration message or a PC5-RRC message), and the UE selects a resource pool and a resource according to a predetermined rule. The UE autonomous resource selection may correspond to one or a plurality of the following resource allocation methods.

UE automatically selects a sidelink resource for transmission

UE assists sidelink resource selection for other UEs

UE receives configuration of NR configured grant for sidelink transmission

UE may schedule sidelink transmissions of other UEs

The resource selection method by a UE may include zone mapping, resource selection based on sensing, random selection, and the like.

In addition, even if UEs exist in a coverage of a base station, resource allocation or resource selection may not be performed in the scheduled resource allocation or the UE autonomous resource selection mode. In this case, a UE may perform V2X sidelink communication through a preconfigured sidelink transmission/reception resource pool.

In addition, if UEs for V2X communication exist out of the coverage of the base station, the UE may perform V2X sidelink communication through a preconfigured sidelink transmission/reception resource pool.

Figure 4:
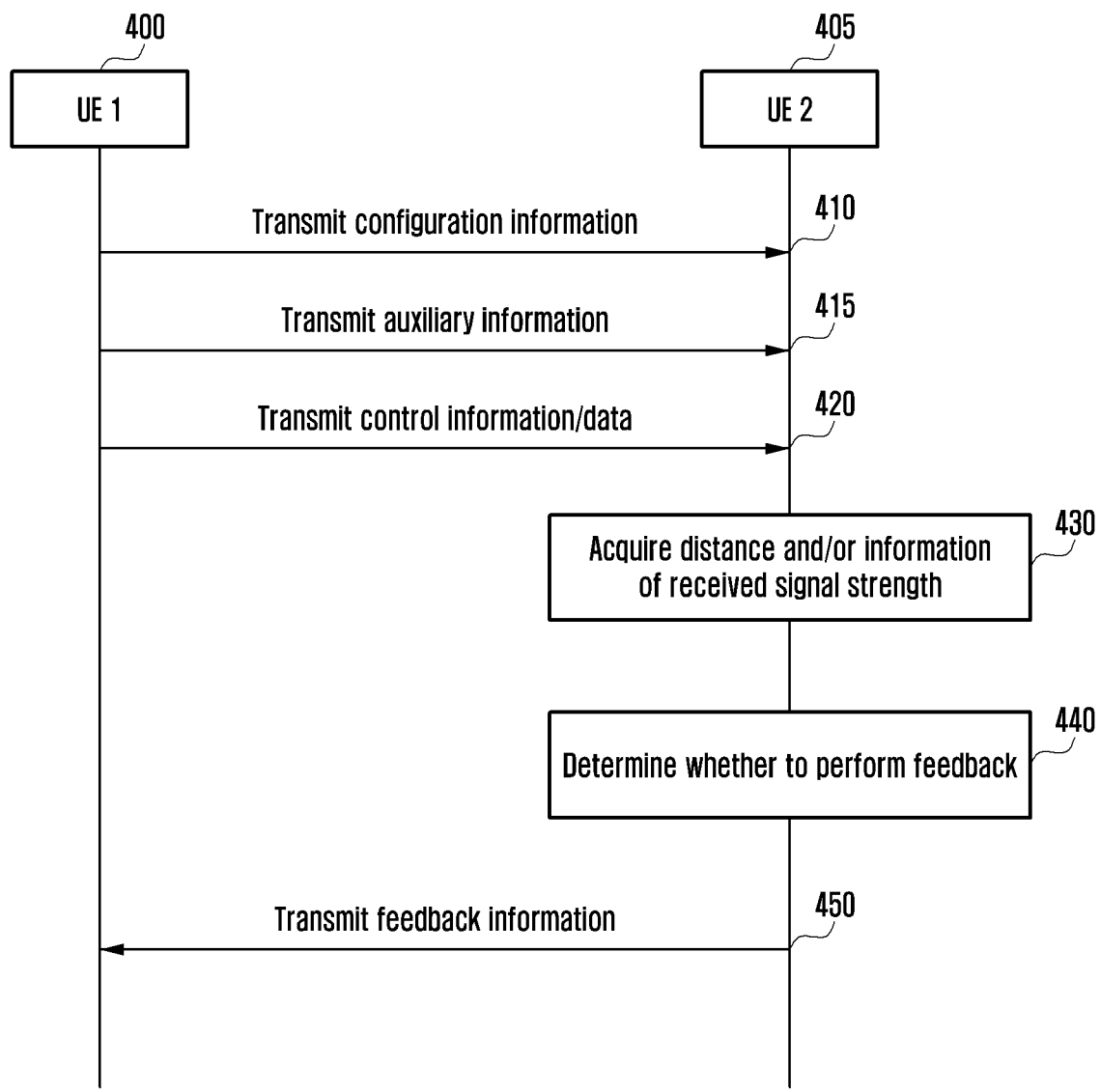
FIG. 4 illustrates a method for transmitting or receiving feedback information according to an embodiment of the disclosure.

FIG. 4 illustrates a method for transmitting or receiving feedback information according to an embodiment of the disclosure.

In a V2X communication system, a UE, which is located in a specific range in a specific situation, needs to receive a message more reliably than a UE which is located at a predetermined distance or more. In this case, the UE located at a predetermined distance or more from a transmission UE may achieve the above object by not feeding back HARQ information.

Referring to FIG. 4, the communication system includes UE1 400 and UE2 405. For convenience of explanation, only UE1 400 and UE2 405 are shown, but there may be a plurality of V2X UEs other than UE1 400 or UE2 405. UE1 400 is assumed to be a V2X transmission UE that transmits V2X control information and data, and UE2 405 is assumed to be a V2X reception UE that receives control information and data from UE1 400 based on V2X communication. However, operations of the V2X transmission UE and the V2X reception UE are not limited thereto, and if UE2 405 includes data to be transmitted to UE1 400, UE2 405 becomes a V2X transmission UE and UE1 400 may perform a role of a V2X reception UE. If the embodiment of FIG. 4 is applied to groupcast communication, UE1 400 may be a leader terminal, and the configuration information may be transmitted to a plurality of reception UEs belonging to a group. If groupcast communication is applied, an operation of UE2 405 may be equally applied to other V2X UEs of a group to which UE2 405 belongs.

In operation 410, UE1 400 transmits configuration information to UE2 405. The configuration information may be HARQ feedback-related information or information including the same. The configuration information may not only be transmitted from UE1 400 to UE2 405, but also may be configured in a process of transmitting or receiving a message between UE1 400 and UE2 405 for the configuration for V2X communication. For example, the HARQ feedback-related information may be configured in a process in which UE1 400 and UE2 405 exchange UE capability for V2X communication through a PC5 RRC. The configuration information may include at least one of the following information.

- Whether to enable/disable HARQ feedback operation based on TX-RX distance
- Whether to enable/disable HARQ feedback operation based on the strength of a received signal (for example, reference signal received power (RSRP))
- An indicator indicating which operation is to be performed among the HARQ feedback operation based on the TX-RX distance and the HARQ feedback operation based on the signal strength. In this case, the indicator may instruct to perform one operation or both operations. This indicator may also be an information indicator about priorities.
- A threshold related to a distance
- A received-signal-strength threshold (e.g., RSRP threshold)
- Information indicating a signal to be used for measurement of the strength of a received signal. In this case, the signal to be used for the measurement may be at least one of the following signals, such as channel state information reference signal (CSI-RS) for sidelink CSI measurement, a demodulation reference signal (DMRS) of PSCCH, DMRS of PSSCH, DMRS of PSBCH, a sidelink primary synchronization signal (S-PSS), a sidelink secondary synchronization signal (S-SSS), a signal of PSCCH, and a signal of PSSCH
- Mapping information between zone and coordinate
- Location information of UE1. In this case, location information of a UE may be coordinate information of the UE or information of a zone in which the UE is located.
- If the location information of UE1 is transmitted through a separate message (auxiliary information), a period in which location information is transmitted, an offset, or a location of a resource (a time resource and a frequency resource)
- If an auxiliary signal for measurement of the strength of a received signal of UE1 is transmitted, a period in which an auxiliary signal is transmitted, an offset, a location of a resource (a time resource and a frequency resource)
- Resource information for HARQ feedback transmission
- Resource information for retransmission. The resource information for HARQ feedback transmission and/or the resource information for retransmission include not only resources distinguished in the time or frequency domain but also resources distinguished by using a code, such as a scrambling code and an orthogonal cover code and resources distinguished by using different sequences (and a cyclic shift applied to the sequence). In addition, the resource information may include multiple pieces of resource information or resource information sets, and in this case, one of multiple pieces of resource information and resource information sets may be indicated by control information in operation 420.
- Information indicating whether HARQ feedback is required
- Transmission option of feedback information
- Resource allocation option of feedback information If the groupcast is applied, an HARQ feedback resource allocation method may consider the following options.

- Option 1: UE common resource: Multiple UEs having received the same sidelink data transmit HARQ feedback information about sidelink data via the same resource
- Option 2: UE-specific resource: Multiple UEs having received the same sidelink data transmit HARQ feedback information about sidelink data via different resources
- Option 3: Multiple UEs having received the same sidelink data form a subgroup according to location information, received signal strength information, or zone information, and UEs belonging to the same subgroup transmit HARQ feedback information via the same resource. Further, UEs belonging to different subgroups transmit HARQ feedback information via different resources.

In addition, an HARQ feedback transmission method may consider the following options.

- Option 1: HARQ feedback information is transmitted using different resources and/or different signals for the Ack or Nack state as a result of data decoding.
- Option 2: As a result of data decoding, HARQ feedback is not transmitted in the Ack state, but is transmitted only in the Nack state, or vice versa.

An option to be used by a UE, among the options, may be pre-configured in the UE, may be indicated through the configuration information, or may be selectively determined according to the received signal strength information or location information identified by a reception UE.

All or some pieces of information included in configuration information transmitted by UE1 400 may be configured by a base station, or may be pre-stored in UE1 400. A detailed process related to this will be described in detail with reference to FIG. 7. In addition, the configuration information may be transmitted through one message or may be transmitted through different messages. For example, some of the configuration information may be transmitted through a first message, and other information of the configuration information may be transmitted through a second message.

In the above discussion, UE2 405 receives configuration information from UE1 400. However, all or some pieces of the configuration information may be received from a base station to which UE2 405 instead of UE1 400 is connected. Alternatively, all or some pieces of the configuration information may be pre-stored in UE2 405.

In operation 415, UE1 400 may transmit a message including auxiliary information including location information of UE1 itself to UE2 405. Alternatively, in operation 415, UE1 400 may transmit an auxiliary signal for measurement of the strength of a received signal. An auxiliary signal for the location information and an auxiliary signal for the received signal strength measurement may be transmitted, respectively. Operation 415 may be optionally included in an embodiment using auxiliary information. The auxiliary information may be periodically transmitted from UE1 400 or may be transmitted aperiodically as needed by UE1 400. If the auxiliary information is periodically transmitted, information about a period in which the auxiliary information is transmitted, an offset, a resource, etc. may be previously provided to UE2 405. For example, configuration information in operation 410 may include information about the period, the offset, the resource, and the like. Operation 415 may be omitted according to a method for providing location information of UE1 400 or a received signal to be measured.

If there is data to be transmitted from UE1 400 to UE2 405, UE1 400 may transmit the data. For example, data to be transmitted to UE2 405 may be generated in a higher layer of UE1 400. In the case of groupcast, data to be transmitted to a group to which UE2 405 belongs may be generated in a higher layer of UE1 400. Generation of data to be transmitted by UE1 400 may be interpreted as that UE1 400 has acquired the data to be transmitted. UE1 400 may transmit control information and/or data to UE2 405 (in operation 420). The control information may be sidelink control information (SCI), and may be information for scheduling the data. The SCI may be transmitted through a physical sidelink control channel (PSCCH), and the data may be transmitted through a physical sidelink shared channel (PSSCH).

The SCI may include at least one of resource allocation information used for transmission of sidelink data, modulation and coding scheme (MCS) information applied to the sidelink data, group destination ID information, transmitter ID (source ID) information, unicast destination ID information, power control information for controlling sidelink power, timing advance (TA) information, DMRS configuration information for sidelink transmission, and packet repetition transmission-related information (for example, the number of times of packet repetitive transmission and resource allocation-related information during packet repetitive transmission). The SCI may further include information indicating a resource for transmission of feedback information (A/N information) for the sidelink data. In this case, if multiple pieces of resource information or resource information sets are configured in the configuration information in operation 410, the information indicating the resource may indicate one of the resource information and the resource information sets.

In addition, the SCI may include information indicating whether HARQ feedback on the data is required and/or a transmission option of feedback information. UE2 405 may receive the SCI, and may receive sidelink data based on the SCI. Thereafter, UE2 405 may perform operations described below to determine whether to perform feedback on sidelink data. If the HARQ feedback is configured not to be performed, the following operations may be omitted.

In operation 430, UE2 405 may identify information for determining whether to perform HARQ feedback. UE2 405 may identify information on the distance between UE1 400 and UE2 405 and/or information of the received signal strength of a signal received from UE1 400. If a distance is configured to be used for HARQ feedback, UE2 405 may identify distance information between UE1 400 and UE2 405. If the received signal strength is configured to be used for HARQ feedback, UE2 405 may identify the strength information of the signal received from UE1 400, and if both the distance information and the received signal strength information are configured to be used for HARQ feedback, UE2 405 may identify the distance information between UE1 400 and UE2 405 and the strength information of the signal received from UE1 400.

UE2 405 may identify the configuration of information required for the HARQ feedback operation method and/or required for performing the HARQ feedback operation, based on operation 410 and configuration information transmitted from a connected base station. For example, if the HARQ feedback operation based on TX-RX distance is enabled or indicated, UE2 405 may identify distance information. In this case, if the configuration information includes other configuration information, for example, a threshold related to a distance and/or location information of UE1, UE2 405 may identify that the HARQ feedback operation based on the TX-RX distance is implicitly indicated. Alternatively, if the HARQ feedback operation based on the received signal strength is enabled or indicated, UE2 405 may identify information on the received signal strength. In this case, if the configuration information includes other configuration information, for example, a reception signal strength threshold and/or information indicating a signal to be used for the received signal strength measurement, UE2 405 may identify that the HARQ feedback operation based on the reception signal strength is implicitly indicated. Alternatively, if the groupcast is configured and it is configured to perform HARQ feedback for the groupcast, UE2 405 may identify at least one of the distance information and the received signal strength information, and may identify that an HARQ feedback operation method corresponding thereto is performed.

Alternatively, if both the distance information and the received signal strength information are enabled or indicated, the HARQ feedback operation method and required information may be identified based on a preconfigured rule or an indicator indicating which information, among the distance information and/or the received signal strength information, to be used for HARQ feedback. Specifically, priorities may be indicated in determining the distance information and the received signal strength information and/or an HARQ feedback operation corresponding thereto. Priorities may be explicitly or implicitly indicated. For example, if the configuration information in operation 410 includes information indicating priorities, explicitly indicated priority information may be used.

In addition, if invalid information among the distance information and the received signal strength information is identified, the invalid information may be excluded in determining whether to perform HARQ feedback. For example, if the provided location information is invalid, if the measured distance information is invalid, and if the measured received signal strength information is out of a valid range, the corresponding information may not be used. For example, if location information is provided and time information including valid location information is provided, and if a time about the valid location information has elapsed, it may be determined that the distance information acquired from the location information is not valid. In this case, it is possible to determine whether to perform HARQ feedback using the received signal strength information. Similarly, if a valid time has elapsed after receiving a signal for the received signal strength measurement, it may be determined that received signal strength information acquired from the corresponding signal is not valid. In this case, whether to perform HARQ feedback may be determined based on the distance information. In addition, in operation 415, if auxiliary information and a timer including valid auxiliary information is valid are provided, and if a time for which the auxiliary information is valid by the timer has elapsed, the location information or the received signal strength information acquired from the corresponding information may be excluded in determining whether to perform HARQ feedback.

In addition, information to be used to determine whether to perform HARQ feedback may be determined according to the mobility of the V2X UE. For example, if UE1 400 does not move, UE1 400 may be configured to perform HARQ feedback using distance information. A UE that does not move may be a UE that has no mobility for a preconfigured time or more. In the same case, a configuration using the received signal strength is not excluded.

A detailed method for identifying the distance information and the information on the received signal strength is described below.

Method for Identifying Distance Information

UE2 405 may identify distance information between UE1 400 and UE2 405. UE2 405 may identify the distance information between UE1 400 and UE2 405 based on location information of UE1 400 and location information of UE2 405. The location information of UE1 400 may be coordinate information of UE1 400 or information of a zone to which UE1 belongs, and the location information of UE2 405 may be coordinate information of UE2 405 or information of a zone to which UE2 belongs. Information of a zone to which a UE belongs may be identified from coordinate information of the UE and mapping information between a zone and coordinates included in the coordinate information.

In the V2X system, various methods for identifying location information of the UE itself by the UE may be used. For example, the UE may acquire its own location information based on a global navigation satellite system (GNSS) or a global positioning system (GPS). In addition, the UE may acquire its own location information based on zone information. In order to identify the relationship between the zone information and the location information, mapping information between a zone and a location may be provided. The zone information may be stored in the UE, and may be received from a base station. Zone information received from the base station may include information on the mapping relationship between the zone and the location information. In addition, the UE may acquire its own location information based on cell location information of a macro cell or a small cell. In an embodiment, a method for acquiring location information of the UE itself by the UE is not limited thereto.

UE2 405 may identify its own location information. UE1 400 may identify its own location information and provide the same to UE2 405. UE2 405 may identify location information of UE1 400 based on the information received from UE1 400.

UE2 405 may receive location information of UE1 400 in the following manner.

Option 1: Perform transmission by including location information of UE1 400 in the HARQ feedback-related configuration information in operation 410

Option 2: Perform transmission by including location information of UE1 400 in PSCCH or PSSCH transmitted in operation 420

Option 3: Perform transmission via auxiliary information in operation 415 including location information In the case of option 2, if the location information is transmitted via a PSCCH, a field for location information may be included in an SCI format. Whether location information is included in the SCI format may be previously instructed to UE2 405. For example, the configuration information of operation 410 may include information indicating whether the location information is included in the SCI format or information enabling or disabling inclusion of the location information. If the location information is transmitted to the PSSCH, the location information may be included in a medium access control (MAC) control element (CE) or data. If the location information is included in the MAC CE, a logical channel identity (LCID) may indicate that location information or related information is included. A MAC sub header of the MAC CE may include the LCID. The LCID may be configured by 6 bit information, and may indicate a type of the MAC CE or information included in the MAC CE. Accordingly, the LCID may indicate whether the MAC CE includes location information. Whether location information is included in the PSSCH may be previously instructed to UE2 405. For example, the configuration information in operation 410 may include information indicating whether location information is included in the PSSCH or information enabling or disabling inclusion of location information.

In the case of option 3, in operation 415, UE1 400 may transmit, to UE2 405, a message including auxiliary information including its own location information. Operation 415 may be optionally included in an embodiment using auxiliary information. The auxiliary information may be periodically transmitted from UE1 400 or may be transmitted aperiodically as needed by UE1 400. If the auxiliary information is periodically transmitted, information about a period in which the auxiliary information is transmitted, an offset, a resource, etc. may be previously provided to UE2 405. For example, configuration information in operation 410 may include information about the period, the offset, the resource, and the like.

Alternatively, location information may be provided by a combination of at least two messages among messages used in the options 1, 2, and 3. For example, first location information may be provided through the configuration information of operation 410, and second location information may be provided in operation 415 or operation 420. The first location information and the second location information may be information related to each other. For example, the first location information may be reference location information, and the second location information may be location information indicating a location from the reference location information. In addition, the location information may be provided using at least two messages among the options 1, 2, and 3. In this case, different types of location information may be provided through different messages. For example, in operation 410, zone information may be provided, and in operation 420, location information based on GPS may be provided.

If UE1 400 provides location information, time information including valid location information may be provided. The time information may be absolute time information, and may be timer information. Valid time information may be information about the speed of UE1 400. If the absolute time is provided, UE2 405 may determine that UE1 400 has valid location information until the indicated absolute time, and if the timer information is provided, UE1 400 may be interpreted to have valid location information until the timer expires. If speed information is provided, UE2 405 may determine whether location information is valid by calculating a time for which the location information is valid based on the speed information.

Method for Identifying Received Signal Strength Information

UE2 405 may measure the strength of a signal received from UE1 400 and identify information of the strength of the received signal. If a reference signal is used to measure the received signal strength, the information on the received signal strength may be RSRP. If the received signal strength is used, UE2 405 may measure the received signal strength with respect to at least one signal among a UE specific reference signal (CSI-RS for sidelink CSI measurement), DMRS of PSCCH, DMRS of PSSCH, DMRS of PSBCH, S-PSS, S-SSS, a signal of PSCCH, a signal of PSSCH, and a dedicated signal for the received signal strength measurement. The dedicated signal for the received signal strength measurement may be transmitted from UE1 400. The auxiliary information may correspond to the dedicated signal for the received signal strength measurement. For example, the auxiliary information may be a reference signal for the received signal strength measurement. The dedicated signal for the received signal strength measurement may be periodically transmitted from UE1 400. If the dedicated signal for the received signal strength measurement is periodically transmitted, UE1 400 may provide UE2 405 with offset information about the periodic signal and location information of a transmission resource in advance.

The type of a signal to be measured by UE2 405 may be instructed from UE1 400 or a base station, and may be pre-stored in UE2 405. In addition, if a signal to be measured by UE2 405 is configured as a basic signal, and if there is no separate instruction from UE1 400, UE2 405 may measure the strength of the received signal using a preconfigured signal, and if there is an indication about a signal to be measured from UE1 400 or the base station, UE2 405 may measure the strength of the received signal based on the indicated signal.

Meanwhile, operation 430 may also be omitted. For example, if UE2 405 acquires distance information or received signal strength information before receiving information of operation 420, operation 430 may be omitted. That is, operation 430 may not be performed at every data reception, and operation 430 may be performed if there is no distance information or received signal strength information valid for determining whether to perform HARQ feedback. Distance information, once measured, or time information including the valid received signal strength may be pre-stored in UE2 405 or may be configured through configuration information of operation 410. Further, after UE2 405 acquires the distance information or the received signal strength information, if the preconfigured time elapses or if UE2 405 moves a predetermined distance or more, operation 430 may be performed by configuring, as a trigger condition, a surrounding wireless environment of UE2 405 (for example, a case where the strength or the interference of a received signal, without being limited to a signal received from UE1, changes to a threshold or more). The trigger condition in operation 430 may be applied as a trigger condition in performing operation 440.

In operation 440, UE2 405 may determine whether to perform feedback. UE2 405 may determine whether to perform the HARQ feedback operation for the data, which is transmitted from UE1 400 in operation 420, based on at least one of received signal strength information and distance information between UE1 400 and UE2 405.

UE2 405 may not perform the HARQ feedback operation if the following conditions are satisfied. If feedback transmission is performed only in the case where the HARQ feedback operation is in the Nack state, UE2 405 may not transmit Nack signal, or vice versa. Alternatively, UE2 405 may not decode the PSSCH if the following conditions are satisfied. Alternatively, if the following conditions are satisfied, UE2 405 may be configured to transmit feedback information only in a case where the result of decoding of the PSSCH is ACK, and configured not to transmit feedback information in a case where the result of decoding of the PSSCH is NACK, or vice versa. A condition that needs to be used by UE2 405 may be preconfigured or may be indicated according to configuration information received from UE1 400 or the base station. Information used in the following conditions may be configured according to configuration information received from UE1 400 or the base station or may be predefined in a communication standard such as 3GPP.

Condition 1: In the case where distance information has a value equal to or greater than a preconfigured threshold Condition 2: In the case where the received signal strength information has a value equal to or less than a preconfigured threshold Condition 3: In the case where it is determined that UE1 400 and UE2 405 exist in different zones Condition 4: In the case where a distance between a zone to which UE1 400 belongs and a zone to which UE2 405 belongs is equal to or greater than a preconfigured threshold or the size of the zone is equal to or greater than a preconfigured threshold Condition 5: In the case where a zone to which UE2 405 belongs does not belong to a preconfigured zone Condition 6: In the case where at least one of condition 1, condition 3, condition 4, or condition 5 is satisfied or condition 2 is satisfied Condition 7: In the case where at least one of condition 1, condition 3, condition 4, or condition 5 is satisfied and condition 2 is satisfied Condition 8: In the case where at least one of conditions 1 to 5 is satisfied according to priorities Although various conditions have been described above, conditions that can be considered in the embodiment are not limited thereto, and various conditions that can be obtained through the distance information and the received signal strength described through the embodiment can be considered.

UE2 405 may determine whether to perform HARQ feedback operation according to conditions mentioned in the above. Although operations 430 and 440 have been described as separate operations, this is for the convenience of explanation and the embodiments are not limited thereto. Operations 430 and 440 may be configured as one operation.

In this manner, UE2 405 may determine whether to perform the HARQ feedback operation based on at least one of the distance information and the received signal strength information. If it is determined in operation 440 that the HARQ feedback operation is not to be performed, operations after operation 450 may not be performed. If it is determined in operation 440 that the HARQ feedback operation is to be performed, UE2 405 may perform operation 450. Performing the HARQ feedback operation means generating the HARQ feedback information based on the result of decoding the received data, and transmitting the generated HARQ feedback information. Not performing the HARQ feedback operation means not performing operations of generating and transmitting HARQ feedback information for the result of decoding the received data.

In operation 450, UE2 405 may generate feedback information and transmit the generated feedback information to UE1 400. UE2 405 may not transmit the feedback information according to a preconfigured feedback method. HARQ feedback operation of the V2X communication may be configured to be activated (or enabled) or deactivated (or disabled). If the HARQ feedback operation is activated, UE2 405 may generate feedback information and transmit the feedback information to UE1 400. Meanwhile, if the HARQ feedback operation is deactivated, operations 430 to 450 may not be performed.

UE2 405 may transmit feedback information based on the result of decoding the data received from UE1 400. The feedback information may be transmitted through a physical sidelink feedback channel (PSFCH) in a sidelink feedback control information (SFCI) format.

If UE2 405 successfully decodes the data received from UE1 400, UE2 405 may transmit HARQ ACK to UE1 400. If UE2 405 does not successfully decode the data received from UE1 400, UE2 405 may transmit HARQ NACK to UE1 400. The decoding of the data may be interpreted as decoding of a transport block (TB). For example, UE2 405 may transmit HARQ ACK or HARQ NACK based on whether the TB received from UE1 400 has been successfully decoded.

If UE2 405 performs a feedback operation, transmission of feedback information may be performed according to the following options.

Option 1: UE2 405 transmits HARQ NACK if decoding of a TB has failed, and UE2 405 does not transmit HARQ feedback information if decoding of the TB is successful, or vice versa.

Option 2: UE2 405 transmits HARQ ACK if decoding of a TB is successful, and UE2 405 transmits HARQ NACK if decoding of the TB has failed.

The option for transmitting the feedback information may be configured by UE1 (in operation 410), may be configured by a base station to which the UE2 is connected, or may be preconfigured in a UE.

In addition, a resource for transmission of the feedback information may be configured or indicated by UE1 (in operation 410 and/or 420), or may be configured by the base station to which the UE2 is connected, and a detailed determination method thereof will be described later in FIG. 7.

After receiving feedback information from UE2 405, UE1 400 may determine whether to perform retransmission according to the feedback information.

Figure 7:
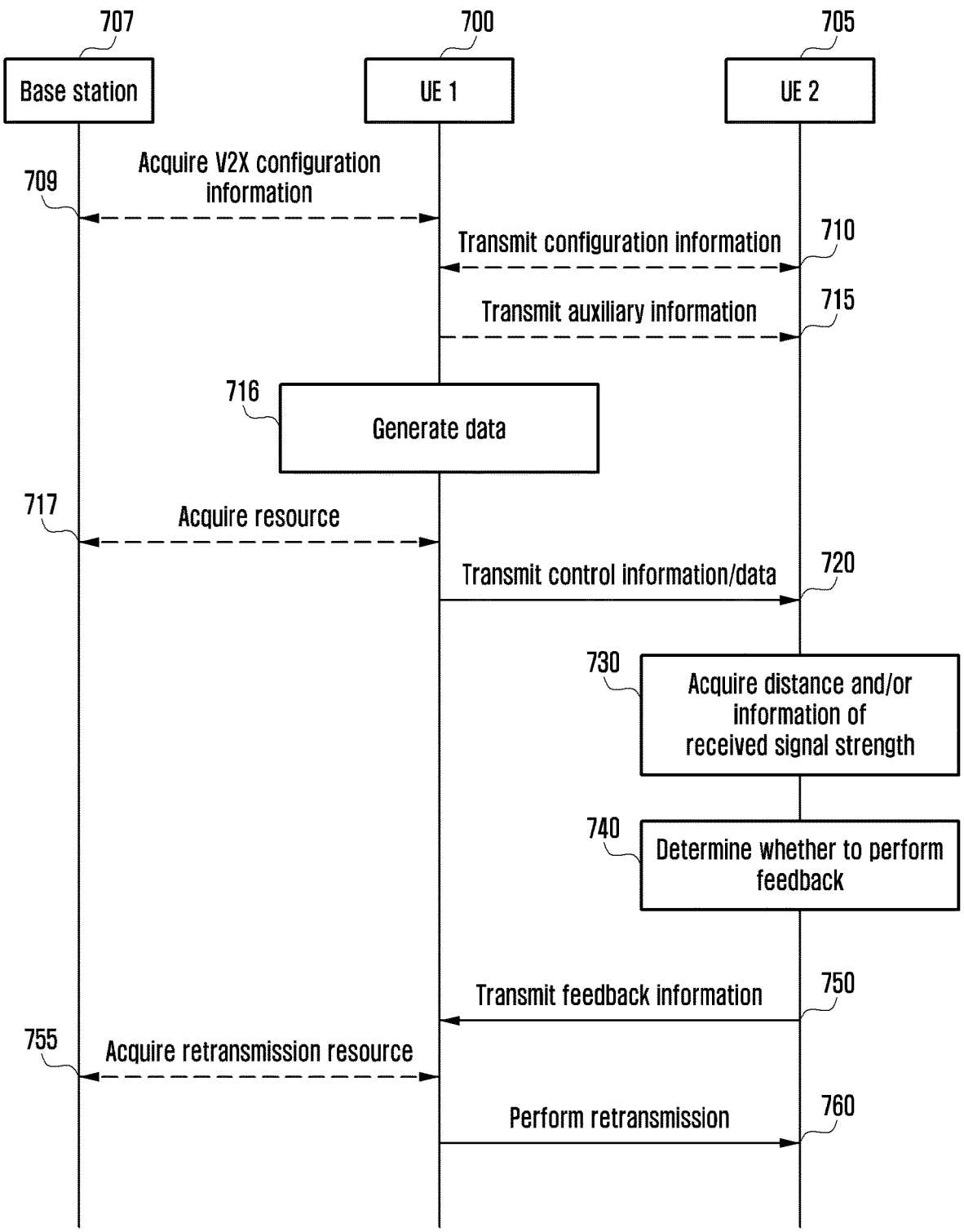
FIG. 7 illustrates a method for transmitting or receiving feedback information according to an embodiment of the disclosure.

Meanwhile, an operation, which corresponds to an operation of FIG. 7, among operations of FIG. 4, may refer to a configuration of FIG. 7, and the scope of rights of the embodiment of FIG. 4 may be extended according to the configuration of FIG. 7.

Figure 5:
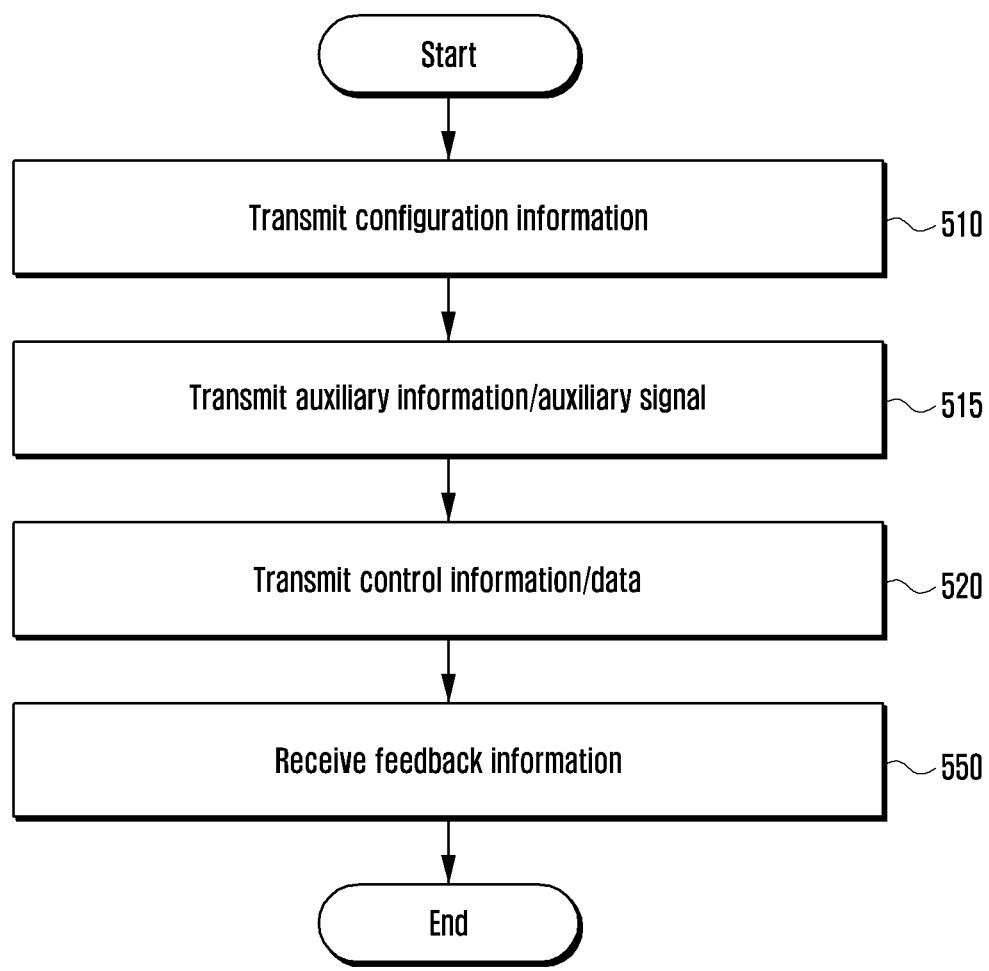
FIG. 5 illustrates an operation of a transmission user equipment (UE) according to an embodiment of the disclosure.

FIG. 5 illustrates an operation of a transmission UE according to an embodiment of the disclosure.

Referring to FIG. 5, hereinafter, a transmission UE will be described as UE1 and a reception UE will be described as UE2. UE1 of FIG. 5 may correspond to UE1 of FIG. 4, and detailed operations of UE1, which are not described in FIG. 5, operations related to FIG. 4 may be referred to.

In operation 510, UE1 transmits configuration information to UE2. The configuration information may be configuration information for V2X communication, and may include HARQ feedback-related information. The configuration information may correspond to configuration information described in operation 510 of FIG. 5, and for details, operation 410 of FIG. 4 may be referred to.

In operation 515, UE1 may transmit auxiliary information or an auxiliary signal to UE2. The auxiliary information may be information including location information of UE1, and the auxiliary signal may be a signal which is used as a reference for measuring the strength of a received signal by UE2. Operation 515 may be omitted by an optional operation of UE1. For details of operation 515, operation 415 of FIG. 4 may be referred to.

In operation 520, data to be transmitted from UE1 to UE2 may be generated. UE1 may transmit control information for scheduling the data and the data to UE2 by using a transmission resource. For details of operation 520, operation 420 of FIG. 4 may be referred to.

In operation 550, UE1 may receive feedback information from UE2. The feedback information is HARQ feedback information. Based on location information provided by UE1, a signal for the received signal strength measurement, information provided for identification of location information or distance information, or information provided for the received signal strength measurement, whether to perform HARQ feedback may be determined. If it is determined to perform HARQ feedback, UE1 may receive HARQ feedback information transmitted by UE2. For details of operation 550, such as an operation of determining whether to perform HARQ feedback operation and an operation of receiving feedback information, operations 430, 440, and 450 of FIG. 4 may be referred to.

Although operations of a transmission UE have been described in FIG. 5, operations of the transmission UE are not limited thereto and may be extended according to operations of a transmission UE of FIG. 4.

Figure 6:
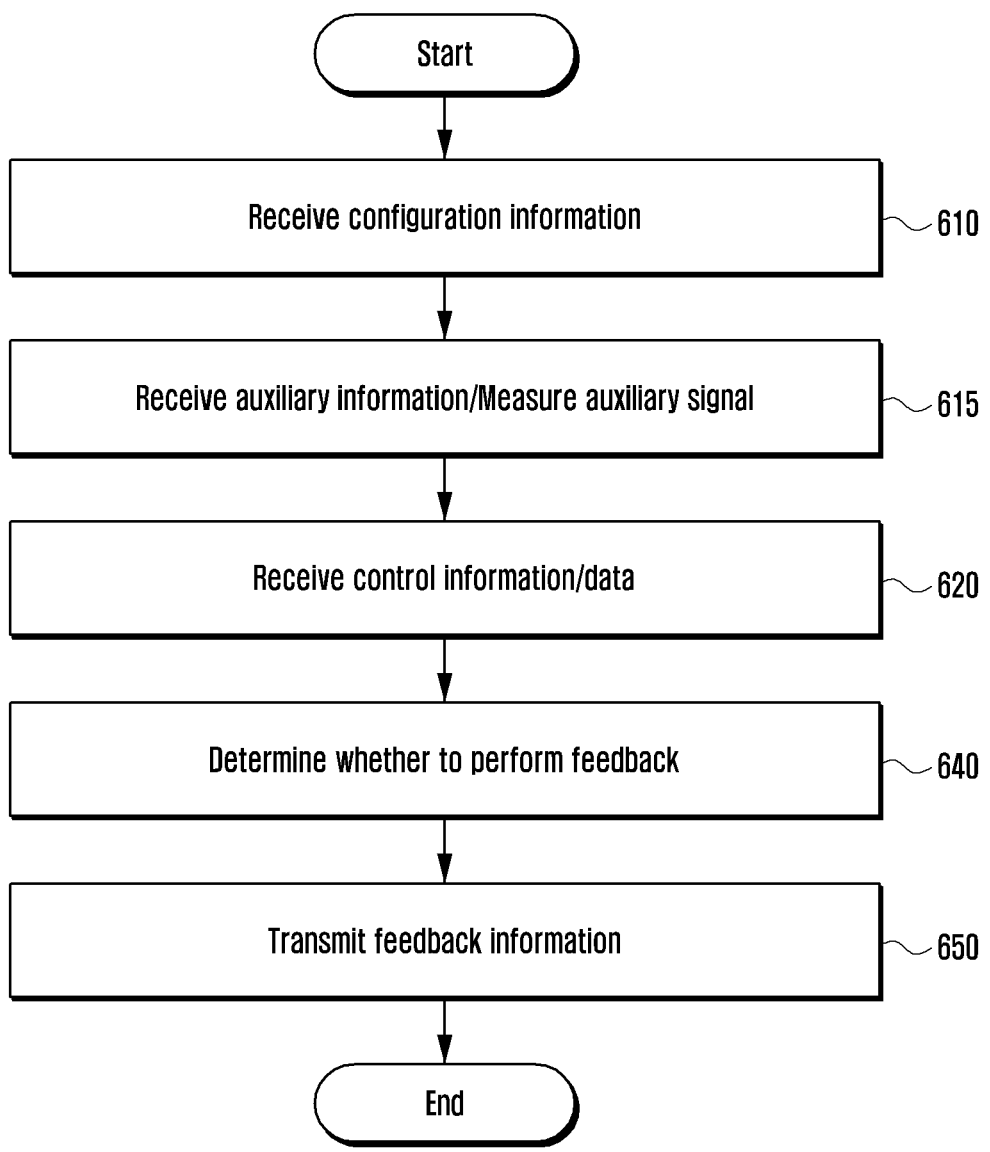
FIG. 6 illustrates an operation of a reception UE according to an embodiment of the disclosure.

FIG. 6 illustrates an operation of a reception UE according to an embodiment of the disclosure.

Referring to FIG. 6, hereinafter, a transmission UE will be described as UE1 and a reception UE will be described as UE2. UE2 of FIG. 6 may correspond to UE2 of FIG. 4, and for detailed operations of UE2, which are not described in FIG. 6, operations related to FIG. 4 may be referred to.

In operation 610, UE2 receives configuration information from UE1. The configuration information may be configuration information for V2X communication, and may include HARQ feedback-related information. UE2 may receive some pieces of information among the configuration information from UE1 and receive other pieces of information from the base station. For example, UE2 may receive V2X configuration information from the base station through system information or an RRC message. The configuration information may correspond to the configuration information described in operation 410, and for details, operation 710 of FIG. 4 may be referred to.

In operation 615, UE2 may receive auxiliary information or an auxiliary signal from UE1. The auxiliary information may be information including location information of UE1, and the auxiliary signal may be a signal which is used as a reference for measurement of the strength of a received signal from UE1. Operation 615 may be omitted. For details of operation 615, operation 415 of FIG. 4 may be referred to.

In operation 620, UE2 may receive control information and data from UE1. UE2 may receive data from a resource, scheduled by the control information, based on the control information. For details of a method for acquiring control information, information included in data, and a resource for receiving the control information and the data, operation 420 of FIG. 4 may be referred to.

In operation 640, UE2 may determine whether to perform a feedback operation. For example, UE2 may determine whether to perform feedback based on at least one of distance information between UE1 and UE2 and received signal strength information received from UE1. A detailed operation of acquiring the distance information and the received signal strength information and a detailed operation of determining whether to perform feedback refer to operations 430 and 440 of FIG. 4.

If it is determined to perform feedback operation, UE2 may transmit feedback information to UE1 in operation 650. A detailed operation of transmitting the feedback information refers to operation 450 of FIG. 4. The feedback information may be used by UE1 to determine whether retransmission is required.

Although the operation of a reception UE has been described in FIG. 6, the operation of the reception UE is not limited thereto and may be extended according to the operation of the reception UE of FIG. 4.

FIG. 7 illustrates a method for transmitting or receiving feedback information according to an embodiment of the disclosure.

Referring to FIG. 7, the communication system includes UE1 700 and UE2 705. For convenience of explanation, only UE1 700 and UE2 705 are illustrated, but there may be a plurality of V2X UEs other than UE1 700 or UE2 705. Further, UE1 700 or UE2 705 is related to a plurality of V2X UEs, and if UE1 700 or UE2 705 is within a coverage of a base station 707 (in the case of in-coverage scenario), UE1 700 or UE2 705 may be connected to a base station 707. The base station 707 may be an eNB or a gNB. UE1 700 is assumed to be a V2X transmission UE that transmits V2X control information and data, and UE2 705 is assumed to be a V2X reception UE that receives control information and data based on V2X communication from UE1 700. However, operations of the V2X transmission UE and the V2X reception UE are not limited thereto, and if UE2 705 includes data to be transmitted to UE1 700, UE2 705 becomes a V2X transmission UE, and UE1 700 may perform the role of the V2X reception UE. If the embodiment of FIG. 7 is applied to groupcast communication, UE1 700 may be a leader terminal, and the configuration information may be transmitted to a plurality of reception UEs belonging to a group. If the groupcast communication is applied, the operation of UE2 705 may be equally applied to other V2X UEs of a group to which UE2 705 belongs.

In the case of an in-coverage scenario, UE1 700 may acquire V2X configuration information from the base station 707 in operation 709. The V2X configuration information may be received through a system information block (SIB) or a radio resource control (RRC) message. The RRC message may be an RRC reconfiguration message or an RRC connection reconfiguration message. The V2X configuration information may include at least one of various parameters included in configuration information of operation 710. If UE2 705 is within a coverage of the base station 707, UE2 705 may also receive V2X configuration information from the base station 707. The operation of the base station 707 is briefly illustrated, but UE1 700 and the base station 707 may transmit or receive a plurality of messages. For example, UE1 700 may acquire an SIB from the base station 707. The SIB may include at least one of: a frequency band in which sidelink transmission/reception applied to a UE is performed; and information for configuring a transmission resource pool and a reception resource pool. Based on the acquisition of the SIB, UE1 700 may transmit UE information to the base station. The UE information may be sidelink UE information. UE1 700 may report, to the base station 707, information corresponding to UE1 itself among V2X-related information received through the SIB. The base station 707 may transmit an RRC connection reconfiguration message or an RRC reconfiguration message, based on the UE information. The RRC message may include at least one of SR and BSR configuration information, a radio network temporary identifier (RNTI) for sidelink (particularly, may be RNTI for V2X), and configuration information required for sidelink transmission, such as transmission/reception resource pool information and frequency band information. UE1 700 may complete a configuration between the base station 707 and UE1 700 by transmitting an RRC connection reconfiguration complete message based on the reception of the RRC connection reconfiguration message or the RRC reconfiguration message. Some of the plurality of messages may be omitted. In addition, operation 709 may be omitted as necessary (for example, in the case where UE1 700 is out of the coverage of the base station).

In operation 710, UE1 700 transmits configuration information to UE2 705. For detailed operations, operation 410 may be referred to.

The HARQ feedback-related information may be configured by the base station 707 and may be pre-stored in a transmission UE. In the case of receiving the HARQ feedback-related information from the base station, the reception will be performed via the SIB. In this case, common HARQ feedback-related information may be configured for multiple UEs in a cell of the base station. The SIB transmitted by the base station may include different HARQ feedback-related information according to V2X services. If the UE is out of the coverage of the base station, the UE may use HARQ feedback-related information previously configured. In addition, it is possible to exchange configuration information through the PC5 RRC between V2X UEs. For example, UEs desiring to perform V2X communication through the PC5 RRC may exchange their capabilities and their own configuration information, and in this process, the HARQ feedback-related information may be configured.

In addition, some information of the HARQ feedback-related information may be configured by the base station 707, and other information may be pre-stored or preconfigured in the transmission UE. In addition, the HARQ feedback-related information may be transmitted through one message or may be transmitted through different messages. For example, some information of the HARQ feedback-related information may be transmitted through a first message, and other information of the HARQ feedback-related information may be transmitted through a second message.

UE1 700 may transmit at least one piece of information among the HARQ feedback-related information to UE2 705. UE2 705 may receive, from UE1 700, at least one piece of information among the HARQ feedback-related information. UE2 705 may receive at least one piece of information among the HARQ feedback-related information from the base station 707, and if UE2 705 receives the HARQ feedback-related information from the base station 707, operation 710 may be omitted, and some information which is not received from the base station 707 may be received through UE1 700.

In operation 716, data to be transmitted from UE1 700 to UE2 705 may be generated. For example, data to be transmitted to UE2 705 may be generated in a higher layer of UE1 700. In the case of groupcast, data to be transmitted to a group to which UE2 705 belongs may be generated in a higher layer of UE1 700. Generation of data to be transmitted by UE1 700 may be interpreted as that UE1 700 has acquired data to be transmitted. Hereinafter, an operation of UE1 700 with respect to UE2 705 may be understood as an operation of UE2 705 or an operation of a group to which UE2 705 belongs.

In operation 717, a UE may acquire a resource for transmission of the data and the control information. The control information is sidelink control information (SCI), and may be information for scheduling the data. UE1 700 may be allocated, from the base station 707, resources for transmission of the SCI and the data. For example, if data to be transmitted is generated from UE1 700, UE1 700 may be allocated a transmission resource based on operation 717. UE1 700 may transmit an SR or a BSR to the base station 707, and may receive a transmission resource (e.g., a sidelink scheduling grant) from the base station 707. A method for acquiring a resource for transmission of the SCI and the data by UE1 700 is not limited to the above-mentioned example, and may use various methods according to the embodiment of FIG. 3.

In operation 720, UE1 700 may transmit the acquired data and control information to UE2 705. For a detailed operation, operation 420 may be referred to.

In operation 730, UE2 705 may identify information for determining whether to perform HARQ feedback. For a detailed operation, operation 430 may be referred to.

In operation 740, UE2 705 may determine whether to perform feedback. For a detailed operation, operation 440 may be referred to.

In operation 750, UE2 705 may generate feedback information and transmit the generated feedback information to UE1 700. For a detailed operation, operation 450 may be referred to, and a method for determining a resource for transmission of the feedback information is as follows.

UE2 705 may transmit the feedback information to UE1 700 according to a transmission option of the feedback information (or UE2 705 may not transmit the feedback information according to the applied option). UE2 705 may transmit feedback information based on a preconfigured HARQ feedback resource. The HARQ feedback resource may include at least one of a time resource or a frequency resource. The HARQ feedback resource may be preconfigured in the UE or may be configured according to configuration information of operation 710.

Method for Acquiring HARQ Feedback Time Resource Information

A time between a physical sidelink shared channel (PSSCH) for data and a PSFCH for HARQ feedback for the data may be configured, or a predetermined value may be used as the time. For example, information about the time may be indicated by the number of slots, the number of sub frames, or the number of symbols. For example, a PSFCH may be configured after n slots, m sub frames, or l symbols from the PSSCH. The n, m, or l values may be configured by the base station 707, or may be preconfigured among UEs performing sidelink communication. The n or m value may be configured through an RRC message.

Method for Acquiring HARQ Feedback Frequency Resource Information

In operation 710 or 720, UE2 705 may acquire HARQ feedback frequency resource information for transmission of feedback information. A frequency resource for transmission of the feedback information may be preconfigured in a UE, may be configured by the base station 707, or may be preconfigured among UEs performing sidelink communication. In addition, an HARQ feedback frequency resource may be related to a scheduled data resource. For example, a resource for data scheduling and a resource for HARQ feedback may be indicated in a resource pool, and if a resource for data is identified, a corresponding HARQ feedback resource may be identified. As another example, the HARQ feedback frequency resource may be related to a resource of a scheduled sidelink control channel. For example, a resource for transmission of sidelink control information and a resource for HARQ feedback may be indicated in a resource pool, and if a resource for sidelink control information is identified, a corresponding HARQ feedback resource may be identified. As still another example, the HARQ feedback frequency resource may be related to a resource of a scheduled downlink control channel. For example, the base station 707 may transmit downlink control information (DCI), via downlink, to perform scheduling of transmission of sidelink control information and data information transmitted in operation 720 by UE1 700. UE1 700, which has received the DCI, may acquire frequency resource information for HARQ feedback through a time/frequency resource in which the DCI is transmitted. UE1 700 may transmit the acquired frequency resource information for HARQ feedback to UE2 705 through a PSCCH in operation 720. This resource information acquisition method may be applied to both unicast and groupcast. Resources for HARQ feedback are not limited to a time resource and a frequency resource, and may include a resource distinguished using a code, such as a scrambling code or an orthogonal cover code, and a resource distinguished using different sequences (and a cyclic shift applied to a sequence).

In operation 760, UE1 700 may determine whether to perform retransmission based on the feedback information received from UE2 705. In the case of unicast or groupcast, retransmission may be required based on the HARQ feedback information. In addition, if necessary, the HARQ feedback of the disclosure may be applied to broadcast transmission. UE1 700 may determine whether sidelink retransmission is required according to HARQ feedback information. If it is determined that retransmission is required, UE1 700 may retransmit data or TB corresponding to HARQ feedback information to UE2 705.

Determination as to Whether to Perform Retransmission

In the case of unicast transmission, retransmission is not performed if HARQ ACK is received, and retransmission is performed if HARQ NACK is received.

In the case of groupcast transmission, various methods may be considered as compared with unicast transmission. In the case of groupcast, some UEs successfully decode data, but other UEs may fail to decode data, so that various retransmission methods may be considered.

If HARQ NACK is received from at least one UE belonging to a group, retransmission is performed.

If HARQ ACK is not received from at least one UE belonging to a group, retransmission is performed.

If a ratio of HARQ NACK received from a UE belonging to a group is equal to or greater than a preconfigured threshold, retransmission is performed.

If a ratio of HARQ ACK received from a UE belonging to a group is equal to or less than a preconfigured threshold, retransmission is performed.

Retransmission is performed by considering location information and HARQ ACK/NACK information at the same time (for example, even if HARQ NACK is received from a UE located in a specific zone, retransmission is not performed)

Retransmission is performed only for a UE, which has transmitted HARQ NACK, or a UE, which has not transmitted HARQ ACK, among UEs belonging to a group.

Retransmission is performed only for a UE belonging to a specific subgroup according to HARQ ACK/NACK among UEs belonging to a group.

Retransmission Resource Selection

UE1 700 may perform retransmission by using a predetermined resource for retransmission, or may receive a resource for retransmission from the base station 707, if retransmission is required, and then perform retransmission. Further, a resource for retransmission may be previously indicated in operation 710 or operation 720. In addition, the resource allocation method described in FIG. 3 may be used for resource selection for retransmission.

In the case of using a mode 1 resource allocation method, UE1 700 may transmit, to the base station 707, information indicating that retransmission is required. UE1 700 may transmit, to the base station 707 which is a serving base station of UE1, an indicator indicating that retransmission is required, through a physical uplink control channel (PUCCH) or a physical uplink shared channel (PUSCH). The indicator indicating that retransmission is required may be transmitted through a scheduling request (SR) or a buffer status report (BSR). The base station 707 having received the indicator may allocate a resource for sidelink retransmission to UE1 700. UE1 700 may perform an operation for acquisition of a retransmission resource in operation 755. Operation 755 may be similar to operation 717, and may include the above-mentioned indicator indicating that retransmission is required, in order to be distinguished from operation 717. If not a case where UE1 700 acquires resources for retransmission directly from the base station, operation 755 may be omitted.

In the case of using a mode 2 resource allocation method, UE1 700 may select a resource for retransmission according to UE autonomous resource selection. Based on resource information obtained by the base station 707 having received a sidelink transmission/reception resource pool for V2X through system information or an RRC message (for example, an RRCReconfiguration message and a PC5-RRC message), or based on preconfigured sidelink transmission/reception resource information, UE1 700 may select a resource pool according to a predetermined rule, and may select a transmission resource within the corresponding resource pool. A specific resource selection method can be understood by referring to the embodiment of FIG. 3.

UE1 700 may perform retransmission using resources for retransmission received from the base station 707. UE1 700 may acquire a resource for sidelink retransmission from the base station 707 in advance without transmitting, to the base station 707, an indicator indicating that retransmission is required. In addition, UE1 700 may perform retransmission based on a preconfigured resource for retransmission between UE1 700 and UE2 705.

The resource allocation method for retransmission is not limited thereto, and a UE may acquire resources for retransmission in various methods.

Operations 730 to 750 may be equally applied to retransmitted data.

Operations 730 and 740 may not be performed if there is no information to be transmitted through HARQ feedback. For example, in the case where UE2 705 successfully decodes data and is configured not to transmit HARQ ACK if data decoding is successful, operations 730 and 740 are not performed. Only in the case where UE2 705 is configured to transmit HARQ NACK, operations 730 and 740 may be performed. As such, in the case where UE2 705 does not include HARQ feedback information that needs to be transmitted according to the result of decoding, operations 730 and 740 may be omitted.

Figure 8:
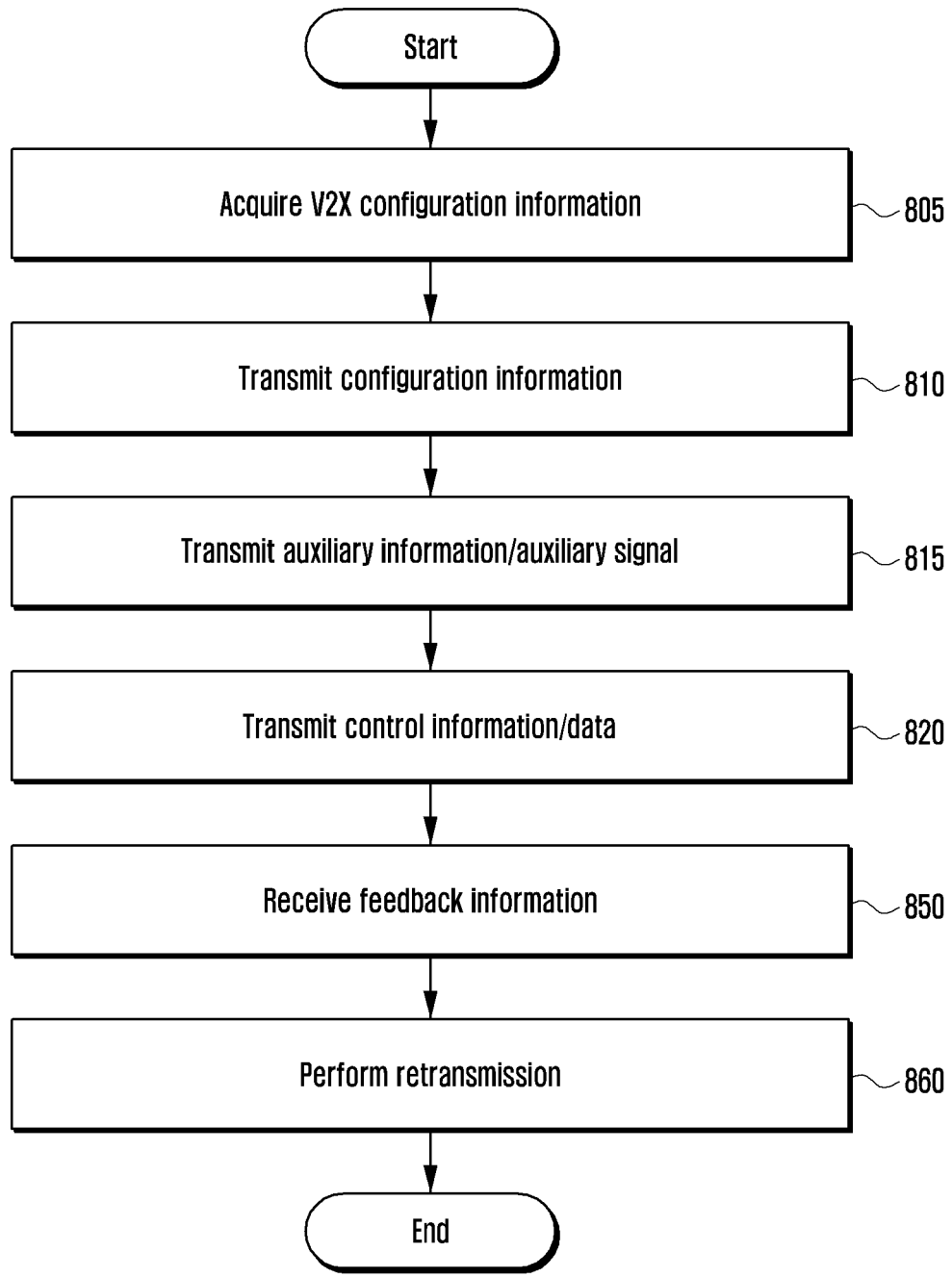
FIG. 8 illustrates an operation of a transmission UE according to an embodiment of the disclosure.

FIG. 8 illustrates an operation of a transmission UE according to an embodiment of the disclosure.

Referring to FIG. 8, hereinafter, a transmission UE will be described as UE1 and a reception UE will be described as UE2. UE1 of FIG. 8 may correspond to UE1 of FIG. 7, and for detailed operations of UE1, which are not described in FIG. 8, operations related to FIG. 7 may be referred to.

In operation 805, UE1 may acquire V2X configuration information from the base station. The V2X configuration information may be acquired through system information, an RRC message, or DCI. For a detailed acquisition method, operation 709 may be referred to. Operation 805 may be performed if UE1 is within the coverage of a base station, and operation 805 may be omitted if UE1 is out of the coverage of the base station.

In operation 810, UE1 transmits configuration information to UE2. The configuration information may be configuration information for V2X communication, and may include HARQ feedback-related information. The configuration information may correspond to configuration information described in operation 710, and for details, operation 710 of FIG. 7 may be referred to.

In operation 815, UE1 may transmit auxiliary information or an auxiliary signal to UE2. The auxiliary information may be information including location information of UE1, and the auxiliary signal may be a signal which is used as a reference for measuring the strength of a received signal by UE2. Operation 815 may be omitted by an optional operation of UE1. For details of operation 815, operation 715 of FIG. 7 may be referred to.

In operation 820, data to be transmitted from UE1 to UE2 may be generated. UE1 may transmit control information for scheduling the data by using a transmission resource and the data to UE2. A method for acquiring control information, information included in data, and a resource for transmission of the control information and the data refer to operations 717 and 720 of FIG. 7.

In operation 850, UE1 may receive feedback information from UE2. The feedback information is HARQ feedback information. Based on location information or a signal for the received signal strength measurement, provided by UE1, information provided for identification of the location information or the distance information, or information provided for the received signal strength measurement, it may be determined whether to perform HARQ feedback. If it is determined to perform HARQ feedback, UE1 may receive HARQ feedback information transmitted by UE2. An operation of determining whether to perform the HARQ feedback operation and an operation of receiving feedback information refer to operations 730, 740, and 750 of FIG. 7.

In operation 860, UE1 may determine whether to perform retransmission based on the received HARQ feedback information. If it is determined that retransmission is required, UE1 may transmit data corresponding to HARQ feedback information and control information for scheduling the data to UE2. For detailed operations, such as a determination as to retransmission and resource allocation for retransmission, operations 755 and 760 of FIG. 7 may be referred to. Operations 715 to 750 may be equally applied to retransmitted data.

Although operations of a transmission UE have been described in FIG. 8, the operations of the transmission UE are not limited thereto and may be extended according to operations of a transmission UE of FIG. 7.

Figure 9:
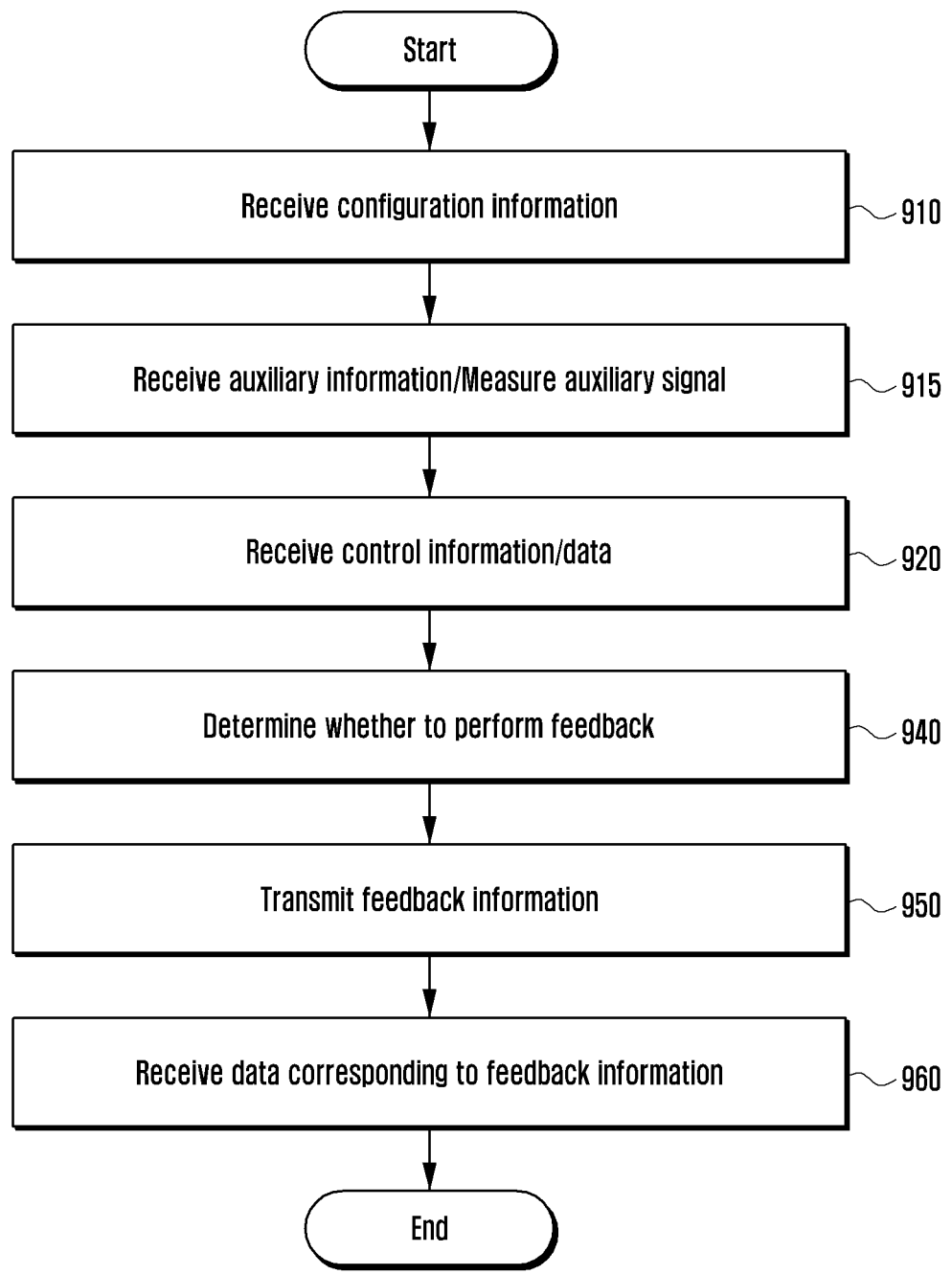
FIG. 9 illustrates an operation of a reception UE according to an embodiment of the disclosure.

FIG. 9 illustrates an operation of a reception UE according to an embodiment of the disclosure.

Referring to FIG. 9, hereinafter, a transmission UE will be described as UE1 and a reception UE will be described as UE2. UE2 of FIG. 9 may correspond to UE2 of FIG. 7, and for detailed operations of UE2, which are not described in FIG. 9, operations related to FIG. 7 may be referred to.

In operation 910, UE2 receives configuration information from UE1. The configuration information may be configuration information for V2X communication, and may include HARQ feedback-related information. UE2 may receive some information among the configuration information from UE1 and other information from a base station. For example, UE2 may receive V2X configuration information from the base station through system information or an RRC message. The configuration information may correspond to configuration information described in operation 710, and for details, operation 710 of FIG. 7 may be referred to.

In operation 915, UE2 may receive auxiliary information or an auxiliary signal from UE1. The auxiliary information may be information including location information of UE1, and the auxiliary signal may be a signal which is used as a reference for measurement of the strength of a received signal from UE1. Operation 915 may be omitted. For details of operation 915, operation 715 of FIG. 7 may be referred to.

In operation 920, UE2 may receive control information and data from UE1. UE2 may receive data from a resource scheduled by the control information, based on the control information. A method for acquiring control information, information included in data, a resource for receiving the control information and the data, and the like refer to operations 717 and 720 of FIG. 7.

In operation 940, UE2 may determine whether to perform a feedback operation. For example, UE2 may determine whether to perform feedback based on at least one of distance information between UE1 and UE2 or received signal strength information received from UE1. A detailed operation of acquiring distance information and received signal strength information and a detailed operation of determining whether to perform feedback refer to operations 730 and 740 of FIG. 7.

If it is determined that the feedback operation is to be performed, UE2 may transmit feedback information to UE1 in operation 950. A detailed operation of transmitting feedback information refers to operation 750 of FIG. 7. UE1 may determine whether retransmission is required based on the feedback information.

If it is determined that retransmission is required, in operation 960, UE2 may receive, from UE1, data corresponding to the HARQ feedback information and control information for scheduling the data. For detailed operations, such as a determination as to retransmission and resource allocation for retransmission, operations 755 and 760 of FIG. 7 may be referred to. Operations 915 to 950 may be equally applied to retransmitted data.

Although operations of a reception UE have been described in FIG. 9, the operations of the reception UE are not limited thereto and may be extended according to operations of the reception UE of FIG. 7.

Figure 10:
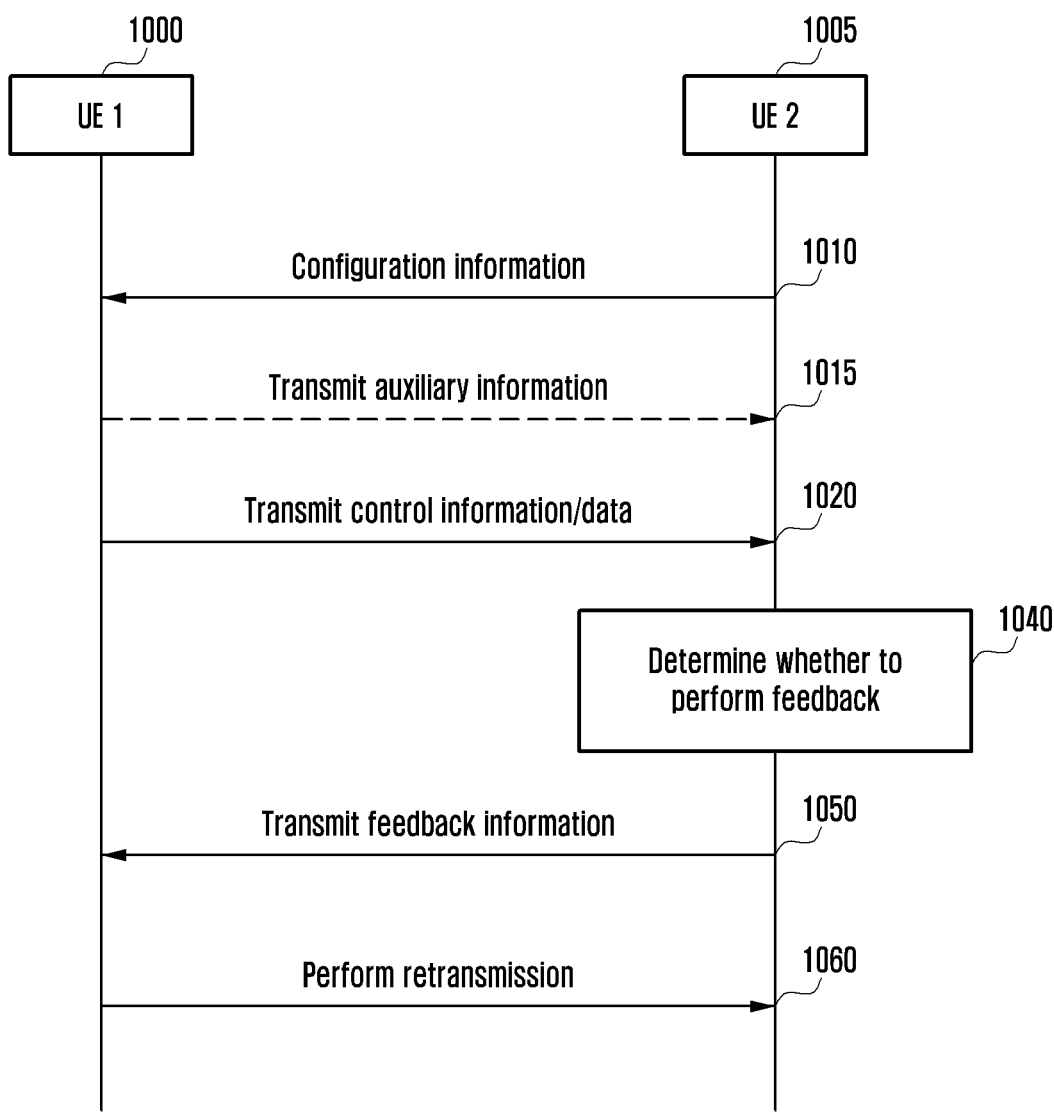
FIG. 10 illustrates a feedback method according to an embodiment of the disclosure.

FIG. 10 illustrates a feedback method according to an embodiment of the disclosure.

In the embodiment of FIG. 7, an operation of determining by UE1, which is a transmission UE, whether to perform HARQ feedback based on distance information or received signal strength, according to operation 710, may be enabled/disabled.

Referring to FIG. 10, in operation 1010, an operation of determining, by a reception UE, whether to perform HARQ feedback based on distance information or received signal strength may be enabled/disabled.

The configuration information may include information on whether to enable/disable an operation of determining whether to perform HARQ feedback based on the distance information or the received signal strength. In addition, the configuration information may include at least one of the configuration information described in operation 710 of FIG. 7. In addition, the configuration information of operation 710 is transmitted from UE1 1000 to UE2 1005, UE2 1005 may transmit, to UE1 1000, information indicating whether to perform HARQ feedback based on the distance information or the received signal strength.

In operation 1015, UE1 1000 may transmit auxiliary information or an auxiliary signal to UE2 1005. For detailed operations, operation 715 may be referred to.

In operation 1020, UE1 1000 transmits control information and data information to UE2 1005.

In operation 1040, UE2 1005 may determine whether to perform HARQ feedback operation based on distance information, which is acquired from location information received from UE1 1000, or received signal strength information of a signal transmitted by UE1 1000.

If it is determined to perform the HARQ feedback operation, in operation 1050, UE2 1005 may transmit feedback information to UE1 1000.

UE1 1000 may determine whether retransmission is required, based on the received feedback information. If it is determined that retransmission is required, UE1 1000 may retransmit data corresponding to the HARQ feedback information to UE2 1005, in operation 1060.

In the embodiment of FIG. 10, operations of UE1 1000 and UE2 1005 are not limited thereto, and may be extended according to the corresponding operation of FIG. 7. For details of each operation, corresponding operation of FIG. 7 may be referred to.

Figure 11:
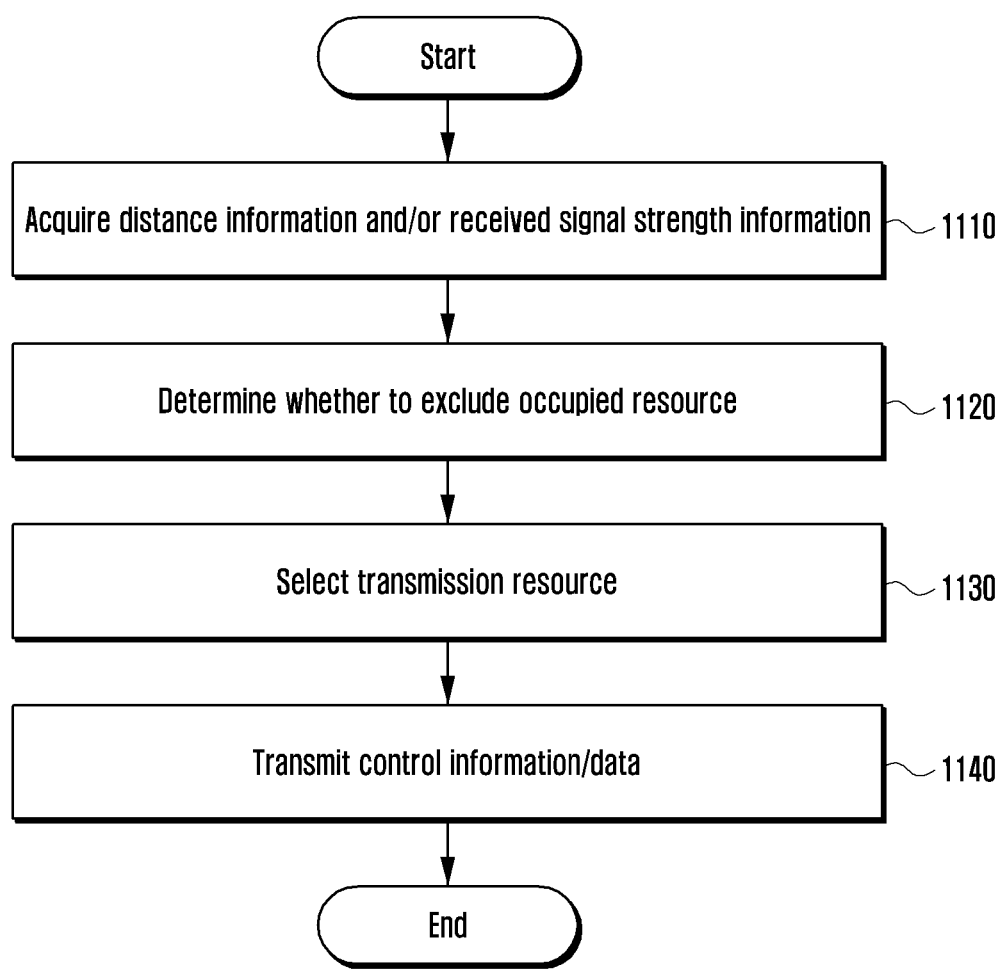
FIG. 11 illustrates a resource selection method according to an embodiment of the disclosure.

FIG. 11 illustrates a resource selection method according to an embodiment of the disclosure.

In the embodiments of FIGS. 4 to 10, if at least one of distance information and received signal strength information is acquired, the acquired information may be used to determine whether to perform the HARQ feedback operation or may be used for resource selection. Hereinafter, UEs of FIGS. 4 to 10 have been assumed to acquire distance information or received signal strength information. Accordingly, the method for acquiring distance information or received signal strength information according to the embodiments of FIGS. 4 to 10 may be equally applied to FIG. 11. In the embodiments of FIGS. 4 to 10, UE2 is a reception UE in relation to UE1. However, UE2 may operate as a transmission UE in V2X communication with other UEs, and may operate, even in relation to UE1, as a transmission UE if there is data to be transmitted to UE1. If UE2 operates as a transmission UE, a transmission resource may be selected from a resource pool. In this case, UE2 determines resources, used by other UEs, to be occupied resources, and selects resources except the occupied resources from a resource pool. In this operation, location information or received signal strength information may be applied in order to identify the occupied resources.

If, in operation 1110, UE2 needs to transmit sidelink data to UE1 through a PSCCH/PSSCH in a unicast, a groupcast, or a broadcast method, UE2 may acquire at least one of distance information and/or received signal strength information from a higher layer of a UE or a base station. The distance information and the received signal strength information may be information about one UE, or may be information, which can be obtained by UE2, among information on multiple UEs.

In operation 1120, UE2 may determine whether to exclude the occupied resources based on at least one of the distance information and/or the received signal strength information. Information about the occupied resources may be obtained by decoding the PSCCH, which is transmitted by UE1 or other UEs, by UE2. More specifically, UE2 may obtain scheduling information of a PSSCH from an SCI transmitted via the PSCCH. In this case, the scheduling information of the PSSCH may be a resource scheduled by a decoded PSCCH or a reserved resource. For example, in the embodiments of FIGS. 4 to 10, resources for transmitting data scheduled by an SCI transmitted from UE1 to UE2 may be occupied resources.

UE2 may identify the occupied resources and determine whether to exclude the occupied resources based on at least one of distance information and/or received signal strength information. If UE2 selects a transmission resource in the case where at least one of the following conditions is satisfied, UE2 may exclude the occupied resources from the resource pool.

> Condition 1: In the case where distance information has a value equal to or less than a preconfigured threshold
> Condition 2: In the case where the received signal strength information has a value equal to or greater than a preconfigured threshold
> Condition 3: In the case where it is determined that UE1 400 and UE2 405 exist in the same zone
> Condition 4: In the case where a distance between a zone to which UE1 belongs and a zone to which UE2 belongs is equal to or less than a preconfigured threshold or the size of the zone is equal to or less than a preconfigured threshold
> Condition 5: In the case where a zone to which UE2 belongs to a preconfigured zone
> Condition 6: In the case where at least one of condition 1, condition 3, condition 4, or condition 5 is satisfied or condition 2 is satisfied
> Condition 7: In the case where at least one of condition 1, condition 3, condition 4, or condition 5 is satisfied and condition 2 is satisfied
> Condition 8: In the case where at least one of conditions 1 to 5 is satisfied according to priorities Although various conditions have been described above, conditions that can be considered in the embodiment are not limited thereto, and various conditions that can be obtained through the distance information and the received signal strength described through the embodiment can be additionally considered.

If there is a conflict between the condition on the distance information and the condition on the received signal strength information, it may be determined whether to exclude the occupied resources based on the condition of the information having a high priority according to priority information.

In addition, if invalid information among the distance information and the received signal strength information are identified, the invalid information may be excluded in determination as to whether to exclude the occupied resources. For a detailed method of determining the validity, the embodiment of FIG. 4 may be referred to.

In operation 1130, UE2 may select a transmission resource. For example, if it is determined that the occupied resource is excluded, UE2 may select a transmission resource from the remaining resources except for a resource, which is identified as the occupied resource in the resource pool. If it is determined that the occupied resource is not excluded, UE2 may select a transmission resource from the resource pool including the occupied resource.

In operation 1140, UE2 may transmit control information and data based on the selected transmission resource.

Figure 12:
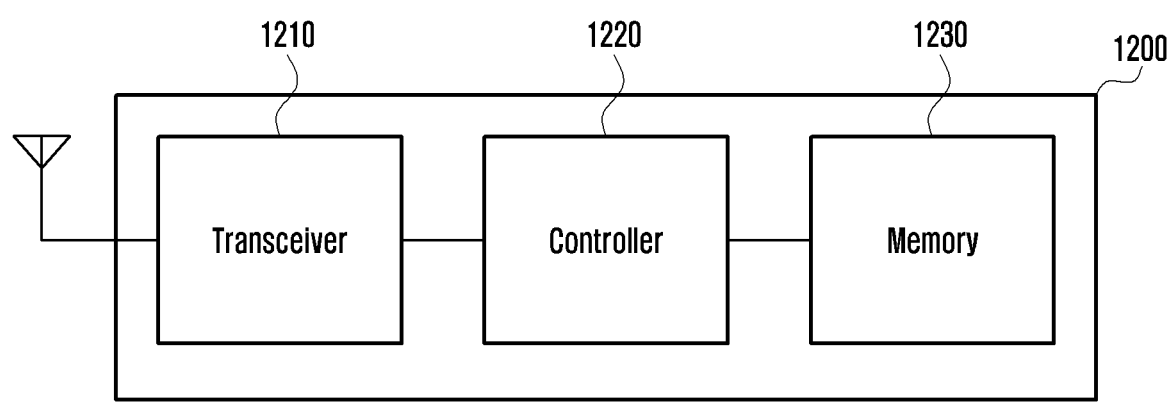
FIG. 12 is a block diagram illustrating the internal structure of a transmission UE according to an embodiment of the disclosure.
Figure 13:
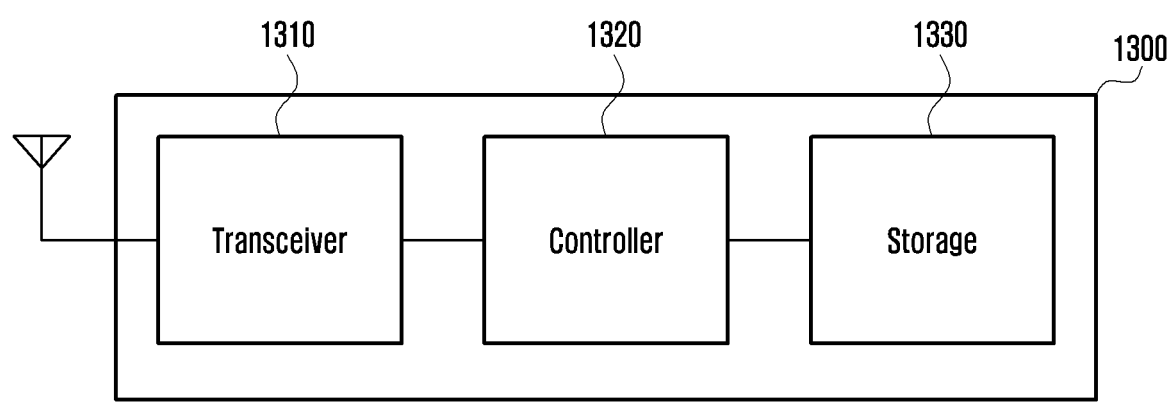
FIG. 13 is a block diagram illustrating the internal structure of a reception UE according to an embodiment of the disclosure.
Figure 14:
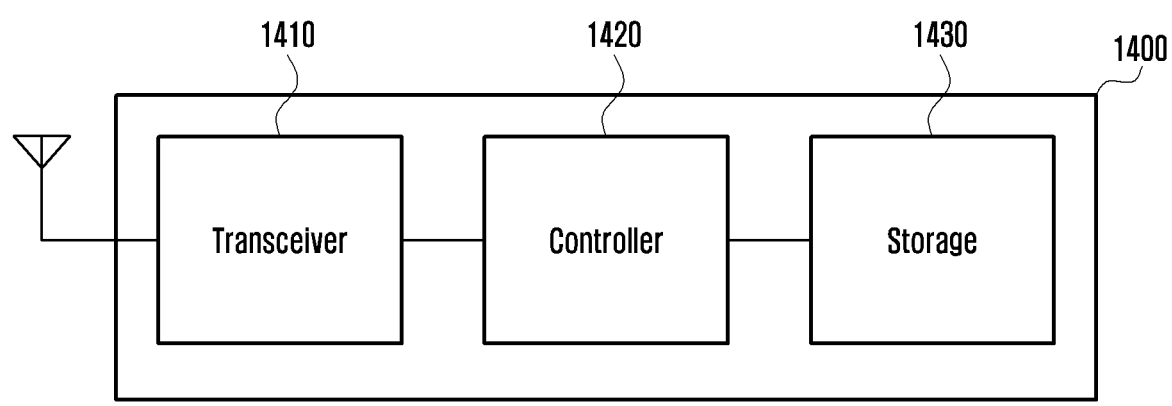
FIG. 14 is a block diagram illustrating the internal structure of a transmission base station according to an embodiment of the disclosure.

An apparatus for carrying out the embodiments is shown in FIGS. 12, 13 and 14.

FIG. 12 is a block diagram illustrating the internal structure of a transmission UE according to an embodiment of the disclosure.

Referring to FIG. 12, a transmission UE 1200 of the disclosure may include a transceiver 1210, a controller 1220, and a memory 1230. The transceiver 1210 may transmit or receive a signal to or from a base station or another UE. The signal may include a synchronization signal, a reference signal, control information, and data. To this end, the transceiver may include an RF transmitter for up-converting and amplifying a frequency of a transmitted signal, and an RF receiver for low-noise amplifying a received signal and down-converting a frequency of the received signal. Further, the transceiver may receive a signal through a wireless channel, output the signal to the controller 1220, and transmit a signal output from the controller 1220 through the wireless channel. The controller 1220 may control a series of processes to operate the transmission UE 1200 according to the above-described embodiment. The controller 1220 may include at least one processor.

The controller 1220 is configured to transmit data of a physical side link shared channel (PSSCH) and sidelink control information (SCI) associated with the data, and to receive, from a reception terminal via the transceiver, a hybrid automatic repeat request (HARQ) feedback for the data. Wherein the HARQ feedback is performed based on a distance between the transmission terminal and the reception terminal, in case that the SCI includes location information of the transmission terminal.

The location information of the transmission terminal corresponds to a zone identity mapped with a location of the transmission terminal, and information for whether the SCI includes the location information of the transmission terminal is provided to the reception terminal.

A threshold is provided to the reception terminal, and the HARQ feedback is received from the reception terminal in case that the distance between the transmission terminal and the reception terminal is smaller or equal to the threshold. All terminals belonging to a group to which the reception terminal belongs share a physical sidelink feedback channel (PSFCH) for the HARQ feedback associated with a groupcast transmission. The HARQ feedback is received from the reception terminal only in case that the reception terminal fails to decode the data of the PSSCH.

Each terminal belonging to a group to which the reception terminal belongs uses a separate PSFCH for the HARQ feedback associated with a groupcast transmission. The HARQ feedback includes one of a HARQ acknowledgement (ACK) corresponding to a successful decoding for the data of the PSSCH or a HARQ negative ACK (NACK) corresponding to a failure of decoding for the data of the PSSCH.

FIG. 13 is a block diagram illustrating the internal structure of a reception UE according to an embodiment of the disclosure.

Referring to FIG. 13, a reception UE 1300 of the disclosure may include a transceiver 1310, a controller 1320, and a storage 1330. The transceiver 1310 may transmit or receive a signal to or from a base station or another UE. The signal may include a synchronization signal, a reference signal, control information, and data. To this end, the transceiver may include an RF transmitter for up-converting and amplifying a frequency of a transmitted signal, and an RF receiver for low-noise amplifying a received signal and down-converting a frequency of the received signal. Further, the transceiver may receive a signal through a wireless channel, output the signal to the controller 1320, and transmit a signal output from the controller 1320 through the wireless channel. The controller 1320 may control a series of processes to operate the reception UE 1300 according to the above-described embodiment. The controller 1320 may include at least one processor.

The controller 1320 is configured to receive, from a transmission terminal data of a physical side link shared channel (PSSCH) and sidelink control information (SCI) associated with the data, and to transmit, to the transmission terminal via the transceiver, a hybrid automatic repeat request (HARQ) feedback for the data. The HARQ feedback is performed based on a distance between the transmission terminal and the reception terminal, in case that the SCI includes location information of the transmission terminal.

The location information of the transmission terminal corresponds to a zone identity mapped with a location of the transmission terminal. Information for whether the SCI includes the location information of the transmission terminal is provided to the reception terminal.

A threshold is received from the transmission terminal, and the HARQ feedback is transmitted to the transmission terminal in case that the distance between the transmission terminal and the reception terminal is smaller or equal to the threshold. All terminals belonging to a group to which the reception terminal belongs share a physical sidelink feedback channel (PSFCH) for the HARQ feedback associated with a groupcast transmission. The HARQ feedback is received from the reception terminal only in case that the reception terminal fails to decode the data of the PSSCH.

Each terminal belonging to a group to which the reception terminal belongs uses a separate PSFCH for the HARQ feedback associated with a groupcast transmission. The HARQ feedback includes one of a HARQ acknowledgement (ACK) corresponding to a successful decoding for the data of the PSSCH or a HARQ negative ACK (NACK) corresponding to a failure of decoding for the data of the PSSCH.

FIG. 14 is a block diagram illustrating the internal structure of a base station according to an embodiment of the disclosure.

Referring to FIG. 14, a transmission UE 1400 of the disclosure may include a transceiver 1410, a controller 1420, and a storage 1430. The transceiver 1410 may transmit or receive a signal to or from a base station or another UE. The signal may include a synchronization signal, a reference signal, control information, and data. To this end, the transceiver may include an RF transmitter for up-converting and amplifying a frequency of a transmitted signal, and an RF receiver for low-noise amplifying a received signal and down-converting a frequency of the received signal. Further, the transceiver may receive a signal through a wireless channel, output the signal to the controller 1420, and transmit a signal output from the controller 1420 through the wireless channel. The controller 1420 may control a series of processes to operate the UE according to the above-described embodiment. The controller 1420 may include at least one processor.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first terminal in a communication system, the method comprising:

transmitting data of a physical side link shared channel (PSSCH) and sidelink control information (SCI) associated with the data; and receiving, from a second terminal, a hybrid automatic repeat request (HARQ) feedback for the data, wherein first information indicating whether the HARQ feedback for the data is enabled is provided from the first terminal to the second terminal, wherein the HARQ feedback is performed based on a distance between the first terminal and the second terminal, in case that the SCI includes location information of the first terminal, and wherein the location information of the first terminal corresponds to a zone identity mapped with a location of the first terminal.

2. The method of claim 1, wherein second information and third information is provided from the first terminal to the second terminal, wherein the second information is associated with whether the SCI includes the location information of the first terminal, and wherein the third information is associated with a transmission option for the HARQ feedback.

3. The method of claim 1, wherein a threshold is provided to the second terminal, and wherein the HARQ feedback is received from the second terminal in case that the distance between the first terminal and the second terminal is smaller or equal to the threshold.

4. The method of claim 3, wherein all terminals belonging to a group to which the second terminal belongs share a physical sidelink feedback channel (PSFCH) for the HARQ feedback associated with a groupcast transmission, and wherein the HARQ feedback is received from the second terminal only in case that the second terminal fails to decode the data of the PSSCH.

5. The method of claim 1, wherein each terminal belonging to a group to which the second terminal belongs uses a separate physical sidelink feedback channel (PSFCH) for the HARQ feedback associated with a groupcast transmission, and wherein the HARQ feedback includes one of a HARQ acknowledgement (ACK) corresponding to a successful decoding for the data of the PSSCH or a HARQ negative ACK (NACK) corresponding to a failure of decoding for the data of the PSSCH.

6. The method of claim 1, wherein information on a number of slots between the data of the PSSCH and a HARQ feedback of a PSFCH is received from a base station.

7. A method performed by a second terminal in a communication system, the method comprising:

receiving, from a first terminal, data of a physical side link shared channel (PSSCH) and sidelink control information (SCI) associated with the data; and transmitting, to the first terminal, a hybrid automatic repeat request (HARQ) feedback for the data, wherein first information indicating whether the HARQ feedback for the data is enabled is provided from the first terminal to the second terminal, wherein the HARQ feedback is performed based on a distance between the first terminal and the second terminal, in case that the SCI includes location information of the first terminal, and wherein the location information of the first terminal corresponds to a zone identity mapped with a location of the first terminal.

8. The method of claim 7,
wherein second information and third information is provided from the first terminal to the second terminal,
wherein the second information is associated with whether the SCI includes the location information of the first terminal, and
wherein the third information is associated with a transmission option for the HARQ feedback.

9. The method of claim 7,
wherein a threshold is received from the first terminal, and
wherein the HARQ feedback is transmitted to the first terminal in case that the distance between the first terminal and the second terminal is smaller or equal to the threshold.

10. The method of claim 9,
wherein all terminals belonging to a group to which the second terminal belongs share a physical sidelink feedback channel (PSFCH) for the HARQ feedback associated with a groupcast transmission, and
wherein the HARQ feedback is transmitted to the first terminal only in case that the second terminal fails to decode the data of the PSSCH.

11. The method of claim 7,
wherein each terminal belonging to a group to which the second terminal belongs uses a separate physical sidelink feedback channel (PSFCH) for the HARQ feedback associated with a groupcast transmission, and
wherein the HARQ feedback includes one of a HARQ acknowledgement (ACK) corresponding to a successful decoding for the data of the PSSCH or a HARQ negative ACK (NACK) corresponding to a failure of decoding for the data of the PSSCH.

12. The method of claim 7, wherein information on a number of slots between the data of the PSSCH and a HARQ feedback of a PSFCH is received from a base station.

13. A first terminal in a communication system, the first terminal comprising:
a transceiver; and
at least one processor configured to:
transmit, via the transceiver, data of a physical side link shared channel (PSSCH) and sidelink control information (SCI) associated with the data, and
receive, from a second terminal via the transceiver, a hybrid automatic repeat request (HARQ) feedback for the data,
wherein first information indicating whether the HARQ feedback for the data is enabled is provided from the first terminal to the second terminal,
wherein the HARQ feedback is performed based on a distance between the first terminal and the second terminal, in case that the SCI includes location information of the first terminal, and
wherein the location information of the first terminal corresponds to a zone identity mapped with a location of the first terminal.

14. The first terminal of claim 13,
wherein second information and third information is provided from the first terminal to the second terminal,
wherein the second information is associated with whether the SCI includes the location information of the first terminal, and
wherein the third information is associated with a transmission option for the HARQ feedback.

15. The first terminal of claim 13,
wherein a threshold is provided to the second terminal, and
wherein the HARQ feedback is received from the second terminal in case that the distance between the first terminal and the second terminal is smaller or equal to the threshold.

16. The first terminal of claim 15,
wherein all terminals belonging to a group to which the second terminal belongs share a physical sidelink feedback channel (PSFCH) for the HARQ feedback associated with a groupcast transmission, and
wherein the HARQ feedback is received from the second terminal only in case that the second terminal fails to decode the data of the PSSCH.

17. The first terminal of claim 13,
wherein each terminal belonging to a group to which the second terminal belongs uses a separate physical sidelink feedback channel (PSFCH) for the HARQ feedback associated with a groupcast transmission, and
wherein the HARQ feedback includes one of a HARQ acknowledgement (ACK) corresponding to a successful decoding for the data of the PSSCH or a HARQ negative ACK (NACK) corresponding to a failure of decoding for the data of the PSSCH.

18. A second terminal in a communication system, the second terminal comprising:
a transceiver; and
at least one processor configured to:
receive, from a first terminal via the transceiver, data of a physical side link shared channel (PSSCH) and sidelink control information (SCI) associated with the data, and
transmit, to the first terminal via the transceiver, a hybrid automatic repeat request (HARQ) feedback for the data,
wherein first information indicating whether the HARQ feedback for the data is enabled is provided from the first terminal to the second terminal,
wherein the HARQ feedback is performed based on a distance between the first terminal and the second terminal, in case that the SCI includes location information of the first terminal, and
wherein the location information of the first terminal corresponds to a zone identity mapped with a location of the first terminal.

19. The second terminal of claim 18,
wherein second information and third information is provided from the first terminal to the second terminal,
wherein the second information is associated with for whether the SCI includes the location information of the first terminal, and
wherein the third information is associated with a transmission option for the HARQ feedback.

20. The second terminal of claim 18,
wherein a threshold is received from the first terminal, and
wherein the HARQ feedback is transmitted to the first terminal in case that the distance between the first terminal and the second terminal is smaller or equal to the threshold.

21. The second terminal of claim 20,
wherein all terminals belonging to a group to which the second terminal belongs share a physical sidelink feedback channel (PSFCH) for the HARQ feedback associated with a groupcast transmission, and
wherein the HARQ feedback is transmitted to the first terminal only in case that the second terminal fails to decode the data of the PSSCH.

22. The second terminal of claim 18,
wherein each terminal belonging to a group to which the second terminal belongs uses a separate physical sidelink feedback channel (PSFCH) for the HARQ feedback associated with a groupcast transmission, and
wherein the HARQ feedback includes one of a HARQ acknowledgement (ACK) corresponding to a successful decoding for the data of the PSSCH or a HARQ negative ACK (NACK) corresponding to a failure of decoding for the data of the PSSCH.

* * * * *